United States Patent
Endo et al.

(10) Patent No.: US 10,027,479 B2
(45) Date of Patent: Jul. 17, 2018

(54) GENERATING DEVICE, ENCRYPTION DEVICE, DECRYPTION DEVICE, GENERATING METHOD, ENCRYPTION METHOD, DECRYPTION METHOD, AND COMPUTER PROGRAM PRODUCT

(71) Applicant: Kabushiki Kaisha Toshiba, Minato-ku (JP)

(72) Inventors: Tsukasa Endo, Ota-ku (JP); Yuichi Komano, Kawasaki (JP); Kazuo Ohta, Chofu (JP); Mitsugu Iwamoto, Arakawa-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 407 days.

(21) Appl. No.: 14/163,243

(22) Filed: Jan. 24, 2014

(65) Prior Publication Data
US 2014/0294176 A1 Oct. 2, 2014

(30) Foreign Application Priority Data
Mar. 26, 2013 (JP) .................................. 2013-064890

(51) Int. Cl.
*H04L 9/08* (2006.01)
*H04L 9/06* (2006.01)

(52) U.S. Cl.
CPC .......... *H04L 9/0869* (2013.01); *H04L 9/0838* (2013.01); *H04L 9/065* (2013.01); *H04L 2209/16* (2013.01)

(58) Field of Classification Search
CPC ..... H04L 9/0869; H04L 9/0838; H04L 9/065; H04L 2209/16
See application file for complete search history.

(56) References Cited

U.S. PATENT DOCUMENTS 6,125,186 A * 9/2000 Saito ....................... H04L 29/06
                                                                    380/260
7,933,414 B2 * 4/2011 Bauchot ............... H04L 12/189
                                                                    380/279
(Continued)

FOREIGN PATENT DOCUMENTS

| JP | 2006-518121 A | 8/2006 |
|---|---|---|
| JP | 2009-278565 A | 11/2009 |
| JP | 2011-254512 A | 12/2011 |

OTHER PUBLICATIONS

C. E. Shannon, "Communication Theory of Secrecy Systems", Bell System Technical Journal, vol. 28, No. 4, 1949, pp. 656-715.
(Continued)

*Primary Examiner* — Catherine Thiaw
*Assistant Examiner* — Thomas Ho
(74) *Attorney, Agent, or Firm* — Oblon, McClelland, Maier & Neustadt, L.L.P.

(57) ABSTRACT

According to an embodiment, a generating device includes a first key generator, a second key generator, and an output unit. The first key generator is configured to generate a first key according to a first key rule in which the first key is generated from a random number, the first key being a bit sequence. The second key generator is configured to generate a plurality of second keys according to a second key rule in which the second keys are generated from the first key, the second keys being bit sequences partly correlated to one another. The output unit is configured to output the first key and at least one of the second keys.

18 Claims, 18 Drawing Sheets

(56) References Cited

U.S. PATENT DOCUMENTS

| | | | |
|---|---|---|---|
| 7,958,369 B2* | 6/2011 | Apostolopoulos | G06F 21/10 380/287 |
| 7,961,871 B2* | 6/2011 | Okubo | H04L 9/0637 380/28 |
| 2001/0031050 A1* | 10/2001 | Domstedt | H04L 9/08 380/44 |
| 2002/0131592 A1* | 9/2002 | Hinnant | H04L 9/0662 380/46 |
| 2002/0159598 A1* | 10/2002 | Rubinstein | H04L 63/061 380/257 |
| 2004/0165726 A1* | 8/2004 | Yamamichi | H04L 9/085 380/277 |
| 2004/0190715 A1* | 9/2004 | Nimura | G06F 21/6209 380/44 |
| 2005/0129247 A1* | 6/2005 | Gammel | G06F 7/582 380/286 |
| 2006/0153364 A1* | 7/2006 | Beeson | H04L 9/3066 380/30 |
| 2008/0144809 A1* | 6/2008 | Okubo | H04L 9/0637 380/28 |
| 2008/0152149 A1* | 6/2008 | Bauchot | H04L 12/189 380/279 |
| 2009/0103726 A1* | 4/2009 | Ahmed | H04L 9/0668 380/46 |
| 2010/0014664 A1* | 1/2010 | Shirai | H04L 9/0618 380/44 |
| 2011/0019822 A1* | 1/2011 | Khan | H04L 9/0643 380/255 |
| 2015/0205970 A1* | 7/2015 | Subires Bedoya | H04L 9/14 713/193 |

OTHER PUBLICATIONS

Japanese Office Action dated Jul. 29, 2016 in Japanese Application No. 2013-064890 (with English translation).

* cited by examiner

FIG.18

| NUMBER OF TARGET PLAINTEXTS | NUMBER OF CLIENT KEYS ATTACKER HAS | | | |
|---|---|---|---|---|
| | 0 | 1 | 2 | 3 |
| 1 | $a_{1,0} = \dfrac{H(M_1\|C)}{H(M_1)}$ | $a_{1,1} = \dfrac{H(M_2\|CK_1)}{H(M_2)}$ | $a_{1,2} = \dfrac{H(M_3\|CK_1K_2)}{H(M_3)}$ | $a_{1,3} = \dfrac{H(M_4\|CK_1K_2K_3)}{H(M_4)}$ |
| 2 | $a_{2,0} = \dfrac{H(M_1M_2\|C)}{H(M_1M_2)}$ | $a_{2,1} = \dfrac{H(M_2M_3\|CK_1)}{H(M_2M_3)}$ | $a_{2,2} = \dfrac{H(M_3M_4\|CK_1K_2)}{H(M_3M_4)}$ | — |
| 3 | $a_{3,0} = \dfrac{H(M_1M_2M_3\|C)}{H(M_1M_2M_3)}$ | $a_{3,1} = \dfrac{H(M_2M_3M_4\|CK_1)}{H(M_2M_3M_4)}$ | — | — |
| 4 | $a_{4,0} = \dfrac{H(M_1M_2M_3M_4\|C)}{H(M_1M_2M_3M_4)}$ | — | — | — |

FIG.19

| NUMBER OF TARGET PLAINTEXTS | NUMBER OF CLIENT KEYS ATTACKER HAS | | | |
|---|---|---|---|---|
| | 0 | 1 | 2 | 3 |
| 1 | $a_{1,0}$ | $a_{1,1}$ | $a_{1,2}$ | $a_{1,3}$ |
| 2 | $a_{2,0} \geq \frac{1}{2}(a_{1,0} + a_{1,1})$ | $a_{2,1} \geq \frac{1}{2}(a_{1,1} + a_{1,2})$ | $a_{2,2} \geq \frac{1}{2}(a_{1,1} + a_{1,3})$ | — |
| 3 | $a_{3,0} \geq \frac{1}{3}(a_{1,0} + a_{1,1} + a_{1,2})$ | $a_{2,1} \geq \frac{1}{3}(a_{1,1} + a_{1,2} + a_{1,3})$ | — | — |
| 4 | $a_{4,0} \geq \frac{1}{4}(a_{1,0} + a_{1,1} + a_{1,2} + a_{1,3})$ | — | — | — |

GENERATING DEVICE, ENCRYPTION DEVICE, DECRYPTION DEVICE, GENERATING METHOD, ENCRYPTION METHOD, DECRYPTION METHOD, AND COMPUTER PROGRAM PRODUCT

CROSS-REFERENCE TO RELATED APPLICATION

This application is based upon and claims the benefit of priority from Japanese Patent Application No. 2013-064890, filed on Mar. 26, 2013; the entire contents of which are incorporated herein by reference.

FIELD

Embodiments described herein relate generally to a generating device configured to generate an encryption key, an encryption device, a decryption device, a generating method, an encryption method, a decryption method, and a computer program product.

BACKGROUND

Medical data such as personal medical histories or health information is stored for a long time to keep track of physical conditions that could possibly develop into illness in the future or to allow proper medical treatments. Any leakage of such information causes serious damage because medical information contains personal information.

The risk of information leakage increases as the retention term increases. Examples of known technologies for securely keeping information concealed for a long time include encryption technologies that information—theoretically ensure security.

When an encryption technology that information—theoretically ensures security is used, a communication device requires, for each communicating counterpart, an encryption key having the same length as the plaintext to be communicated. Therefore, the size of the encryption key to be managed by the communication device is increased when there are a large number of communication counterparts or when a long plaintext is to be communicated.

BRIEF DESCRIPTION OF THE DRAWINGS

FIG. 18 is a schematic diagram of the security $a_{i,y}$ for a case in which the number of client keys $K_i$ is four (n=4);
FIG. 19 is a schematic illustrating the security $a_{x,y}$ for a case in which the number of client keys $K_i$ is four (n=4), derived from the security $a_{1,y}$ for a case in which the number of target plaintexts is one.

DETAILED DESCRIPTION

According to an embodiment, a generating device includes a first key generator, a second key generator, and an output unit. The first key generator is configured to generate a first key according to a first key rule in which the first key is generated from a random number, the first key being a bit sequence. The second key generator is configured to generate a plurality of second keys according to a second key rule in which the second keys are generated from the first key, the second keys being bit sequences partly correlated to one another. The output unit is configured to output the first key and at least one of the second keys.

First Embodiment

Figure 1:
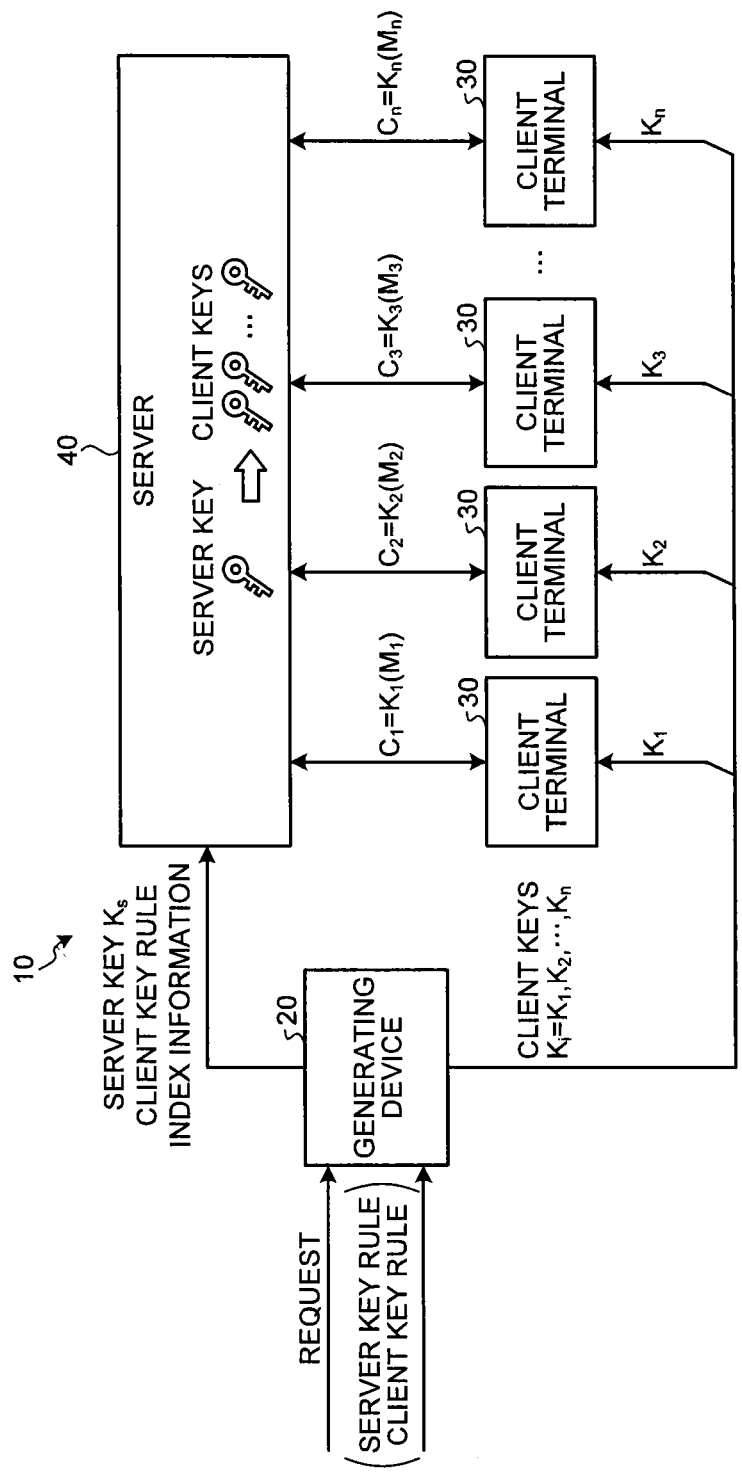
FIG. 1 is a schematic diagram of the configuration of an encryption system according to a first embodiment.

FIG. 1 is a schematic diagram of the configuration of an encryption system 10 according to a first embodiment. The encryption system 10 includes a generating device 20, a plurality of client terminals 30, and a server 40.

The generating device 20 is an information processing apparatus such as a computer. The generating device 20 generates a server key (first key) $K_S$ from a random number based on a server key rule (first key rule). The generating device 20 also generates a plurality of (n, in this example) client keys (second keys) $K_i$ (=$K_1, K_2, \ldots, K_n$) each of which is a bit sequence partly having a correlation with one another from the server key $K_S$ based on a client key rule (second key rule).

Here, n represents the number of client keys $K_i$ generated from one server key $K_S$, and is an integer equal to or more than two; i is a value for identifying each of the client keys $K_i$, and referred to as an index; and i is mapped to each of the client keys $K_i$, and is an integer equal to or more than one and equal to or less than n, in this example.

Each of the n client keys $K_i$ is a bit sequence for encrypting a plaintext to generate a ciphertext, and for decrypting the ciphertext into the plaintext. In other words, the client key $K_i$ is an encryption key containing the same data sequence for the encryption and the decryption. Each of the n client keys $K_i$ is secret information managed confidentially.

The server key $K_S$ is a bit sequence used as a seed for generating the n client keys $K_i$. The data sequence of the server key $K_S$ itself is not an encryption key for encrypting any plaintext. The server key $K_S$ is also secret information managed confidentially.

The server key rule and the client key rule are electronic data described in a computer-executable format, and is a function, a computer program, or the like executed by a computer. The server key rule is a rule (e.g., a function or a computer program) for generating a server key $K_S$ from a random number. The client key rule is a rule (e.g., a function or a computer program) for generating client keys $K_i$ from the server key $K_S$.

More specifically, a client key rule is a rule for extracting one or more partial sequences from the server key $K_S$ and generating client keys $K_i$. In other words, a client key rule is a rule for determining a client key $K_i$. A client key $K_i$ is determined based on a first partial sequence set having one or more partial sequences as its elements. At least one partial sequence is shared between first partial sequence sets for two client keys $K_i$, among a plurality of client keys $K_i$. A partial sequence is partial information of the server key $K_S$. The server key rule and the client key rule may be public information (in other words, information not concealed), or may be secret information managed confidentially.

The generating device 20 generates index information indicating a mapping relation of the index i of a client key $K_i$ to the corresponding client terminal 30. A plurality of indices i may be mapped to one client terminal 30. The generating device 20 transmits each of the n client keys $K_i$ generated by the generating device 20 to a client terminal 30 corresponding to the index i.

The generating device 20 transmits the server key $K_S$ thus generated and the client key rule to the server 40. When a public client key rule is used, the generating device 20 does not need to transmit the client key rule to the server 40. The generating device 20 also transmits the index information to the server 40.

The server 40 is an example of an information processing apparatus (first information processing apparatus) executing data processing. The server 40 receives the server key $K_S$ and the client key rule from the generating device 20. When a public client key rule is used, the server 40 acquires the client key rule from the source information processing apparatus. The server 40 also receives the index information indicating a mapping relation between each of the client terminals 30 and the index i of the corresponding client key $K_i$ received by that client terminal 30 from the generating device 20.

Each of the client terminals 30 is an example of another information processing apparatus (second information processing apparatus) executing data processing. Each of the client terminals 30 may be medical equipment or various types of electronic devices provided with a build-in information processing apparatus. Each of the client terminals 30 receives a corresponding client key $K_i$ from the generating device 20.

In the encryption system 10 having such a configuration, encrypted communications are established between the server 40 and each of the client terminals 30 using the client keys $K_i$. When ciphertexts are to be communicated from the client terminals 30 to the server 40, the following process is performed.

Each of the client terminals 30 generates a ciphertext $C_i$ (=$C_1, C_2, \ldots, C_n$) by encrypting a plaintext $M_i$ (=$M_1, M_2, \ldots, M_n$) using a corresponding client key $K_i$ (=$K_1, K_2, \ldots, K_n$). As an example, each of the client terminals 30 generates a ciphertext $C_i$ by performing an EXCLUSIVE-OR operation on the plaintext $M_i$ and the client key $K_i$ both of which have the same bit length. Each of the client terminals 30 then transmits the ciphertext $C_i$ thus generated to the server 40.

The server 40 receives the ciphertext $C_i$ from the client terminal 30. The server 40 refers to the index information and detects the index i of the client key $K_i$ used in encrypting the ciphertext $C_i$, from the terminal information of the client terminal 30 having transmitted the ciphertext $C_i$. The server 40 generates a corresponding client key $K_i$ by inputting the index i thus detected and the server key $K_S$ to the client key rule. The server 40 then generates the plaintext $M_i$ by decrypting the ciphertext $C_i$ using the client key $K_i$ thus generated.

When a ciphertext is to be communicated from the server 40 to the client terminal 30, the following process is performed. The server 40 refers to the index information and detects the index i of the client key $K_i$ stored by a destination client terminal 30, from the terminal information of the destination client terminal 30. The server 40 then generates a corresponding client key $K_i$ by inputting the index i thus detected and the server key $K_S$ to the client key rule. The server 40 generates the ciphertext $C_i$ by encrypting the plaintext M using the client key $K_i$. The server 40 then transmits the ciphertext $C_i$ thus generated to the corresponding client terminal 30. The client terminal 30 receiving the ciphertext $C_i$ generates the plaintext $M_i$ by decrypting the ciphertext $C_i$ with the client key $K_i$ stored on the client terminal 30.

For example, the encryption system 10 having such a configuration allows the server 40 to collect and to centrally manage privacy information and the like stored by a large number of client terminals 30. For example, the encryption system 10 may be applied to a medical system in which the server 40 collects detection data from a plurality of sensors or the like detecting the conditions of patients (thermometers, sphygmomanometers, heart rate monitors) and centrally manages such detection data, by causing such sensors to function as the client terminals 30. When an output of the detection data is required, the server 40 can generate a corresponding client key $K_i$ from the server key $K_S$ and the client key rule, and decrypts the detection data.

The encryption system 10 may also change the server key $K_S$ and the client keys $K_i$ among given groups (among hospitals, hospital wards, hospital departments, or responsible doctors), as an example, so that the confidentiality to those external to the group can be enhanced.

Figure 2:
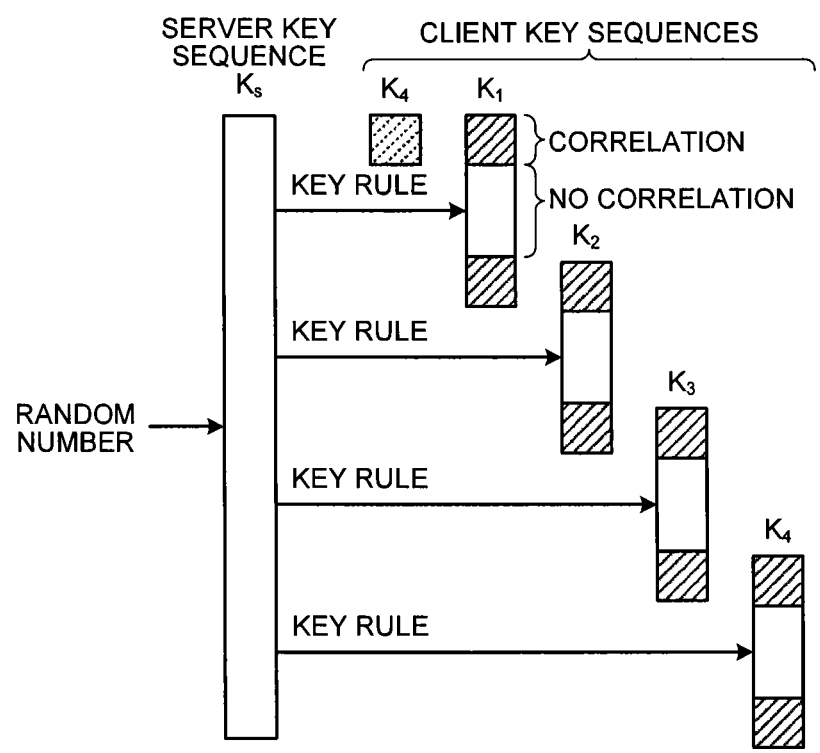
FIG. 2 is a schematic diagram of a relation between a server key and a plurality of client keys.

FIG. 2 is a schematic diagram of a relation between a server key $K_S$ and a plurality of client keys $K_i$.

The generating device 20 generates a plurality of client keys $K_i$ that are bit sequences partly correlated with one another based on the client key rule for generating the client keys $K_i$. Bit sequences correlated with one another herein mean, as an example, a relation of those having completely the same bit pattern, or those not having completely the same bit pattern but resulting in the same bit pattern when a predetermined data conversion is applied (e.g., a bitwise NOT operation, a one-to-one function, or a linear transformation).

By allowing the n client keys $K_i$ to have such correlations, the encryption system 10 can generate some of the client keys $K_i$ using the same partial sequence of the server key $K_S$. In this manner, the encryption system 10 can make the bit length of the server key $K_S$ shorter than the total bit length of the n client keys $K_i$. As a result, the encryption system 10 enables the server 40 to avoid storing all of the n client keys $K_i$ or storing a server key $K_S$ having the same bit length as the total bit length of the n client keys $K_i$. Therefore, the n client keys $K_i$ can be managed easily.

The sequence of one of the client keys $K_i$ may include a plurality of partial sequences having a correlation with two or more of the other client keys $K_i$. For example, the sequence of a first client key $K_1$ may include a partial sequence having a correlation with a second client key $K_2$ and another partial sequence having a correlation with a third client key $K_3$. In this manner, the generating device 20 can generate client keys $K_i$ allowing the key length of the server key $K_S$ to be reduced efficiently.

Furthermore, the sequence of one of the client keys $K_i$ may include a partial sequence having a correlation with some of the other client keys $K_i$ at the same time. For example, the sequence of the first client key $K_1$ may include a partial sequence having a correlation with both of the second client key $K_2$ and the third client key $K_3$. In this manner, the generating device 20 can generate client keys $K_i$ allowing the key length of the server key $K_S$ to be reduced efficiently.

Furthermore, the sequence of each of the client keys $K_i$ may include a partial sequence having no correlation with the other client keys $K_i$. In this manner, the generating device 20 can increase the security in the case of acquisition of any of the other client keys $K_i$ by an attacker.

In the sequence of one of the client key $K_i$, a longer partial sequence having no correlation with the other client keys $K_i$ can enhance the tolerance against attacks and thus increase the security in the case of acquisition of any of the other client keys $K_i$ by an attacker on one hand, but increase the bit length of the server key $K_S$ on the other. By contrast, in the sequence of one of the client keys $K_i$, a longer partial sequence having a correlation with any of the other client keys $K_i$ can decrease the bit length of the server key $K_S$ on one hand, but lower the tolerance against attacks and thus decrease the security in the case of acquisition of any of the other client keys $K_i$ by an attacker on the other.

Therefore, the encryption system 10 may adjust the level of correlation between each of the client keys $K_i$ and the other client keys $K_i$ (e.g., the ratio of sequences with and without a correlation, the number of other client keys $K_i$ having a correlation to the same sequence) depending on the environment in which the encryption system 10 is used, or the like. In this manner, the encryption system 10 can generate client keys $K_i$ at the security level required by a user.

Figure 3:
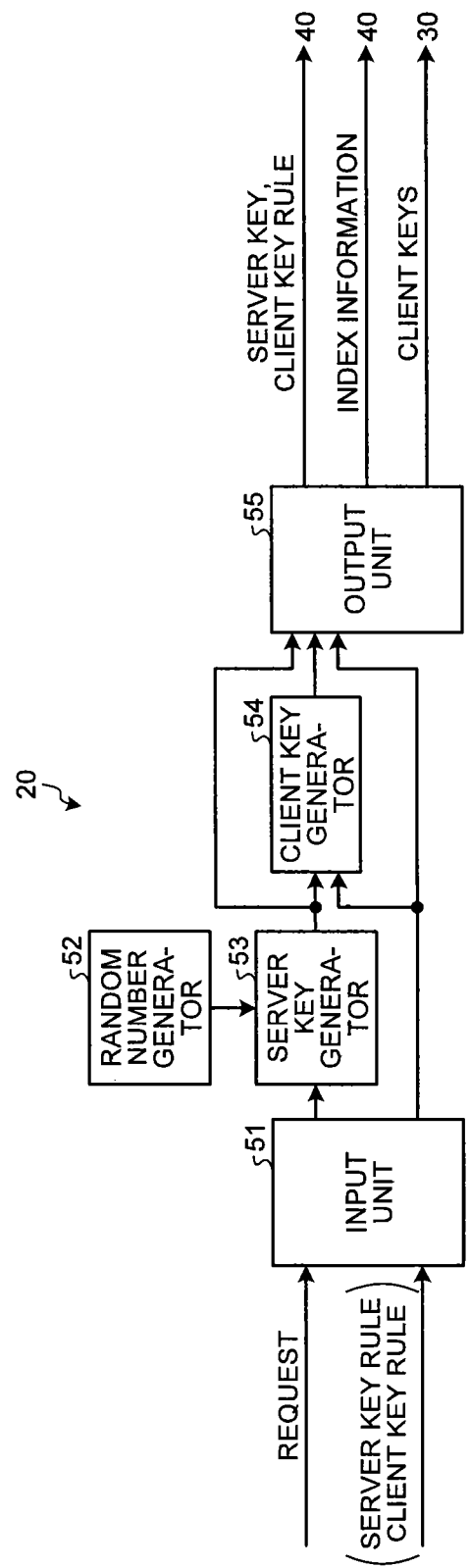
FIG. 3 is a schematic diagram of the configuration of a generating device according to the first embodiment.

FIG. 3 is a schematic diagram of the configuration of the generating device 20 according to the first embodiment. The generating device 20 includes an input unit 51, a random number generator 52, a server key generator (first key generator) 53, a client key generator (second key generator) 54, and an output unit 55.

The input unit 51 receives an input of a key generation request entered by a user. The input unit 51 also receives a server key rule and a client key rule from an external information processing apparatus, for example. Alternatively, the input unit 51 may acquire the internal server key rule and client key rule that are privately stored, without receiving the server key rule and the client key rule from an external information processing apparatus or the like. The input unit 51 passes the server key rule to the server key generator 53, and passes the client key rule to the client key generator 54 and to the output unit 55.

The random number generator 52 generates a random number, and passes the random number thus generated to the server key generator 53. The server key generator 53 generates a server key $K_S$ from the random number generated by the random number generator 52, based on the server key rule received from the input unit 51. The server key generator 53 passes the server key $K_S$ thus generated to the client key generator 54 and to the output unit 55.

The client key generator 54 generates the n client keys $K_i$ from the server key $K_S$ received from the server key generator 53 and the client key rule received from the input unit 51. The client key generator 54 passes the n client keys $K_i$ thus generated to the output unit 55.

The output unit 55 outputs the server key $K_S$ received from the server key generator 53 and the client key rule received from the input unit 51 to the server 40. The output unit 55 does not need to output the client key rule to the server 40 when the server 40 is capable of acquiring the client key rule from an external information processing apparatus or the like.

The output unit 55 also outputs the n client keys $K_i$ received from the client key generator 54 to the respective client terminal 30. The output unit 55 also outputs index information indicating a mapping relation between a client terminal 30 and the index i of the client key $K_i$ output to the client terminal 30 to the server 40.

Figure 4:
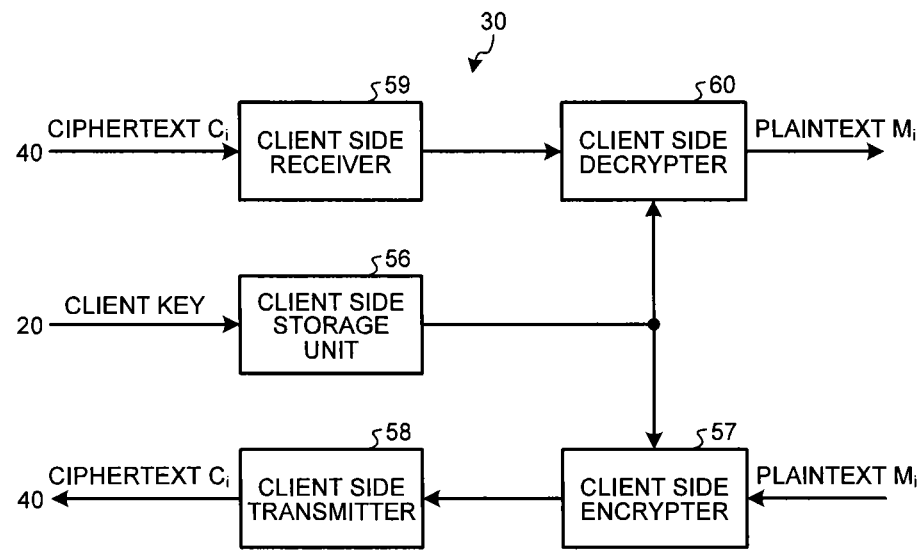
FIG. 4 is a schematic diagram of the configuration of a client terminal according to the first embodiment.

FIG. 4 is a schematic diagram of the configuration of the client terminal 30 according to the first embodiment. The client terminal 30 includes a client side storage unit 56, a client side encrypter 57, a client side transmitter 58, a client side receiver 59, and a client side decrypter 60. The client side storage unit 56 receives and stores the client key $K_i$ received from the generating device 20.

When a ciphertext $C_i$ is to be transmitted to the server 40, the client side encrypter 57 receives a plaintext $M_i$ from the client terminal itself, for example. The client side encrypter 57 generates the ciphertext $C_i$ by encrypting the received plaintext $M_i$ using the client key $K_i$ stored by the client side storage unit 56. The client side encrypter 57 then passes the ciphertext $C_i$ thus generated to the client side transmitter 58. The client side transmitter 58 then transmits the ciphertext $C_i$ received from the client side encrypter 57 to the server 40.

When a ciphertext $C_i$ is to be received from the server 40, the client side receiver 59 receives the ciphertext $C_i$ transmitted from the server 40, and passes the received ciphertext $C_i$ to the client side decrypter 60. The client side decrypter 60 then generates a plaintext $M_i$ by decrypting the ciphertext $C_i$ received from the client side receiver 59 with the client key $K_i$ stored by the client side storage unit 56. The client side decrypter 60 then outputs the plaintext $M_i$ thus generated to the client terminal itself, for example. When the encryption and decryption are executed by the same process, the client side encrypter 57 and the client side decrypter 60 may be realized as a common module, for example.

Figure 5:
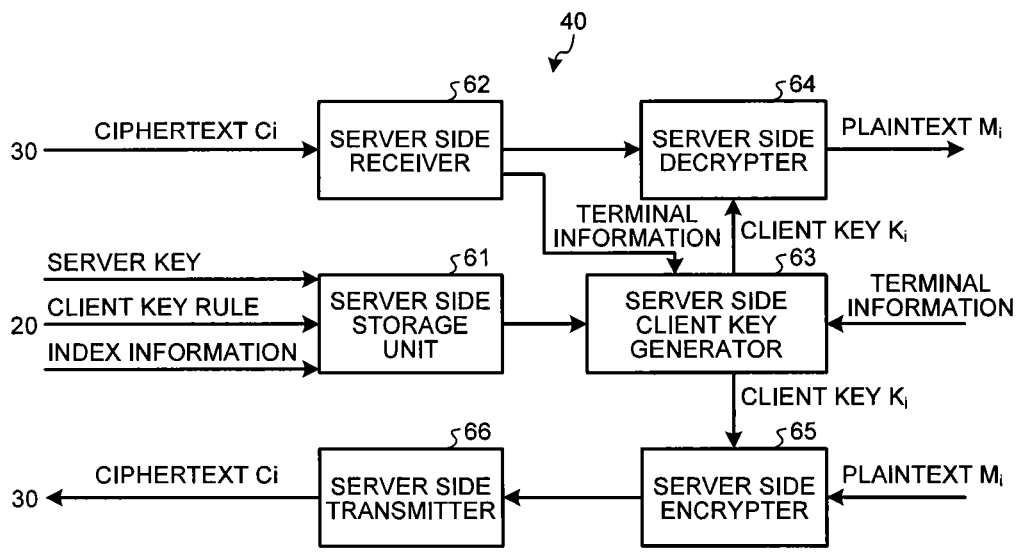
FIG. 5 is a schematic diagram of the configuration of a server according to the first embodiment.

FIG. 5 is a schematic diagram of the configuration of the server 40 according to the first embodiment. The server 40 includes a server side storage unit 61, a server side receiver 62, a server side client key generator 63, a server side decrypter 64, a server side encrypter 65, and a server side transmitter 66.

The server side storage unit 61 receives the server key $K_S$ and the client key rule from the generating device 20. When a public client key rule is used, the server side storage unit 61 receives the client key rule from the source information processing apparatus. The server side storage unit 61 also receives and stores the index information indicating a relation between each of the client terminals 30 and the index i of the client key $K_i$ from the generating device 20.

The server side receiver 62 receives the ciphertext $C_i$ transmitted by the client terminal 30, and passes the received ciphertext $C_i$ to the server side decrypter 64. The server side receiver 62 also passes the terminal information identifying the client terminal 30 having transmitted the ciphertext $C_i$ to the server side client key generator 63.

When the ciphertext $C_i$ is received, the server side client key generator 63 identifies the index i of the client key $K_i$ used in generating the ciphertext $C_i$ based on the terminal information received from server side receiver 62 and the index information stored by the server side storage unit 61. Once the index i is identified, the server side client key generator 63 generates the client key $K_i$ corresponding to the index i from the server key $K_S$ stored by the server side storage unit 61 based on the client key rule also stored by the server side storage unit 61. The server side client key generator 63 then passes the client key $K_i$ thus generated to the server side decrypter 64.

The server side decrypter 64 generates a plaintext $M_i$ by decrypting the ciphertext $C_i$ received from the server side receiver 62 using the client key $K_i$. The server side decrypter 64 then outputs the plaintext $M_i$ thus generated.

When a ciphertext $C_i$ is to be transmitted, the server side client key generator 63 acquires the terminal information identifying the destination client terminal 30 to which the ciphertext is to be transmitted. The server side client key generator 63 identifies the index i of the client key $K_i$ stored on the destination client terminal 30 based on the received terminal information and the index information stored by the server side storage unit 61. Once the index i is identified, the server side client key generator 63 generates a client key $K_i$ corresponding to the index i from the server key $K_S$ stored by the server side storage unit 61, based on the client key rule also stored by the server side storage unit 61. The server side client key generator 63 then passes the client key $K_i$ thus generated to the server side encrypter 65.

The server side encrypter 65 receives a plaintext $M_i$ from the external. The server side encrypter 65 generates the ciphertext $C_i$ by encrypting the plaintext $M_i$ thus received with the client key $K_i$ received from the server side client key generator 63. The server side encrypter 65 then passes the ciphertext $C_i$ thus generated to the server side transmitter 66. The server side transmitter 66 then transmits the ciphertext $C_i$ received from the server side encrypter 65 to the destination client terminal 30. When the encryption and decryption are executed by the same process, the server side decrypter 64 and the server side encrypter 65 may be realized as a common module, for example.

Figure 6:
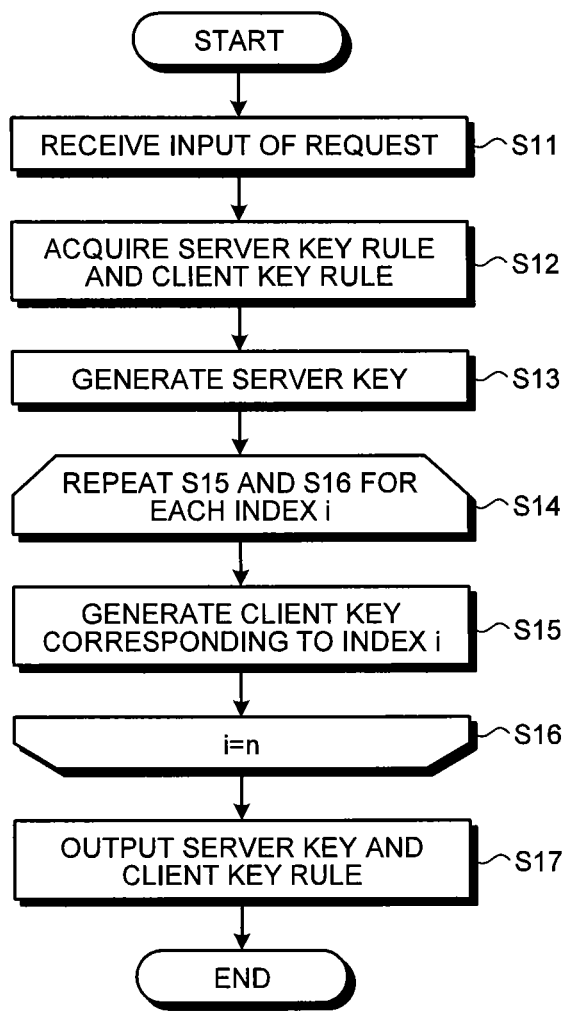
FIG. 6 is a flowchart of a process performed by the generating device according to the first embodiment.

FIG. 6 is a flowchart of a process performed by the generating device 20 according to the first embodiment. To begin with, at Step S11, the input unit 51 in the generating device 20 receives a key generation request. At Step S12, the input unit 51 acquires a server key rule and a client key rule.

At Step S13, the server key generator 53 in the generating device 20 executes the server key rule, and generates a server key $K_S$ from the random number. In this example, the server key rule is a server key function that receives an input of a random number r and outputs a bit sequence of a server key $K_S$, as indicated in Expression (1) below. The server key function indicated in Expression (1) will be described later in detail with reference to FIG. 7.

$$SKeyGen(r) \to K_s \quad (1)$$

The client key generator 54 in the generating device 20 then executes a loop process from Step S14 to Step S16 for each of the indices i. In this example, the client key generator 54 executes the process at Step S15 while incrementing i from i=1 to i=n.

At Step S15, the client key generator 54 generates a client key $K_i$ corresponding to the index i by executing the client key rule based on the server key $K_S$. In this example, the client key rule is a client key function that receives an input of the server key $K_S$ and the index i, and outputs a bit sequence of the client key $K_i$, as indicated by Expression (2) below. The client key function indicated in Expression (2) will be described later in detail with reference to FIG. 8.

$$CKeyGen(K_s, i) \to K_i \quad (2)$$

When i=n, the client key generator 54 exits the loop process, and moves the process to Step S17. At Step S17, the output unit 55 in the generating device 20 outputs the server key $K_S$ and the client key rule to the server 40. When the server 40 can acquire the client key rule from the external, the output unit 55 does not need to output the client key rule to the server 40.

The output unit 55 then outputs each of the n client keys $K_i$ to the corresponding client terminal 30. Once the process at Step S17 is completed, the generating device 20 ends the process.

Figure 7:
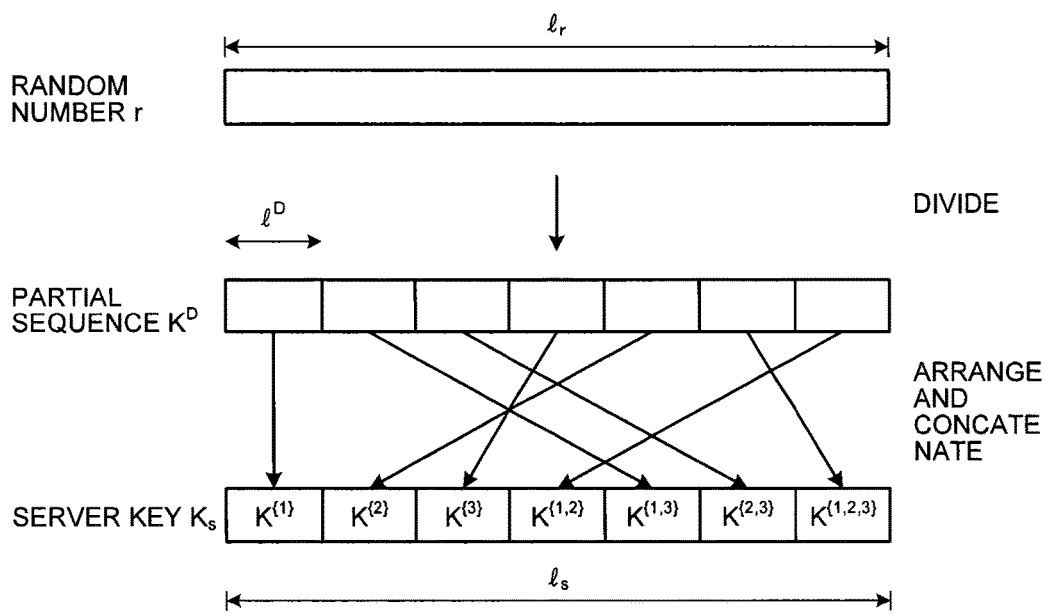
FIG. 7 is a schematic diagram of an example of details of a server key function.

FIG. 7 is a schematic diagram of an example of details of the server key function (SKeyGen(r)). The server key function receives an input of the random number r.

The server key function divides the random number r thus received into a plurality of partial sequences. The server key function also maps the partial sequences to a plurality of respective sets D.

Each of the sets D is a set having indices as its elements, and represents every combination of the indices from 1 to n. For example, when n=3 (in other words, when i=1, 2, 3), sets D={1}, {2}, {3}, {1, 2}, {1, 3}, {2, 3}, and {1, 2, 3}. {x, y, z} represents a set of a combination of x, y, and z.

A partial sequence mapped to a set D is denoted by $K^D$. Therefore, the random number r can be expressed by following Equation (3), as an example. Here, ∥ is an operator for concatenating the bit sequences adjacent thereto. A partial sequence $K^D$ indicates that the partial sequence is information to be used in generating client keys $K_i$ corresponding to the elements of the set D. For example, $K^{\{1, 2\}}$ is information used in generating client keys $K_1$ and $K_2$.

$$K^{\{1\}} \| K^{\{2\}} \| \ldots \| K^{\{1,2\}} \| K^{\{1,3\}} \| \ldots K^{\{1,2,3\}} \| \ldots K^{\{1,2,\ldots,n\}} = r \quad (3)$$

The bit length of each of the partial sequences is determined by the server key function. The bit length of a partial sequence $K^D$ is denoted by $l^D$. $l^D$ is an integer equal to or more than zero.

The server key function arranges and concatenates a plurality of partial sequences $K^D$ into a row. As an example, the server key function positions the partial sequences mapped to sets D having smaller numbers of indices (elements) further on the left side. When the numbers of indices (elements) are the same, a partial sequence with a set D including an index (element) of a smaller number is positioned further on the left side.

As an example, when $K^{\{1\}}$ and $K^{\{2, 3\}}$ are given, the server key function positions $K^{\{1\}}$, which has a smaller number of indices (elements), on the left side. As another example, when $K^{\{1, 2\}}$ and $K^{\{2, 3\}}$ are given, the server key function positions $K^{\{1, 2\}}$, having indices (elements) of smaller numbers, on the left side. As still another example, when $K^{\{1, 2\}}$ and $K^{\{1, 3\}}$ are given, the server key function positions $K^{\{1, 2\}}$, having an index (element) of a smaller number, on the left side.

The server key function then concatenates the partial sequences thus arranged, and outputs a server key $K_S$, as indicated in Equation (4) below. Illustrated in FIG. 7 is an exemplary arrangement for a case in which n=3.

$$K_s = K^{\{1\}} \| K^{\{2\}} \| \ldots \| K^{\{1,2\}} \| K^{\{1,3\}} \| \ldots K^{\{1,2,3\}} \| \ldots K^{\{1,2,\ldots,n\}} \quad (4)$$

Such a server key function can generate a $l_s$-bit server key $K_S$ from a $l_r$-bit random number, where $l_r = l_s$, for example. The partial sequences may be arranged in any predetermined way.

Figure 8:
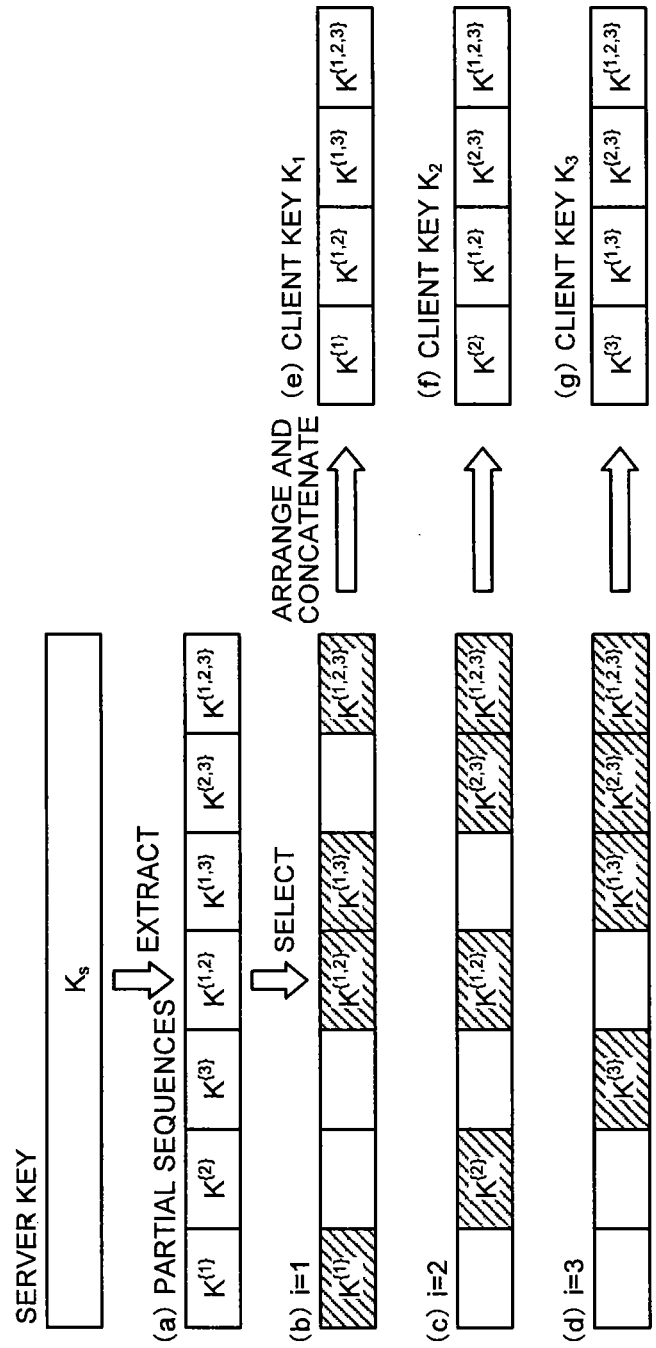
FIG. 8 is a schematic diagram of an example of details of a client key function.

FIG. 8 is a schematic diagram of an example of details of a client key function (CKeyGen($K_S$, i)). The client key function receives inputs of the server key $K_S$ and a value of the index i.

The client key function extracts a plurality of partial sequences $K^D$ from the server key $K_S$ thus received. In other words, the client key function extracts the partial sequences in the manner indicated by Equation (5) below. In FIG. 8, (a) indicates the partial sequences extracted when n=3.

$$K^{\{1\}}, K^{\{2\}}, \ldots, K^{\{1,2\}}, K^{\{1,3\}}, \ldots, K^{\{1,2,3\}}, \ldots, K^{\{1,2,\ldots,n\}} \quad (5)$$

The client key function then selects two or more partial sequences corresponding to the sets including the index value thus received as its element from the partial sequences thus extracted. For example, when i=1, the client key function selects partial sequences indicated by Equation (6) below. In FIG. 8, (b) indicates partial sequences selected when n=3, i=1.

$$K^{\{1\}}, K^{\{1,2\}}, K^{\{1,3\}}, \ldots, K^{\{1,2,3\}}, \ldots, K^{\{1,2,\ldots,n\}} \quad (6)$$

As another example, when i=2, the client key function selects the partial sequences indicated by Equation (7) below. In FIG. 8, (c) indicates the partial sequence selected when n=3, i=2.

$$K^{\{2\}}, K^{\{1,2\}}, K^{\{2,3\}}, \ldots, K^{\{1,2,3\}}, \ldots, K^{\{1,2,\ldots,n\}} \quad (7)$$

As still another example, the client key function selects the partial sequences indicated by Equation (8) below when i=n. In FIG. 8, (d) indicates the partial sequence selected when n=3, i=3.

$$K^{\{n\}}, K^{\{1,n\}}, K^{\{2,n\}}, \ldots, K^{\{1,2,n\}}, \ldots, K^{\{1,2,\ldots,n\}} \quad (8)$$

The client key function then arranges and concatenates the two or more partial sequences $K^D$ thus selected into a row. As an example, the client key function positions the partial sequences mapped to sets D having smaller numbers of indices (elements) further on the left side. When the numbers of indices (elements) are the same, a partial sequence with a set D including an element of a smaller number is positioned further on the left side. The way at which the partial sequences are arranged is the same as that accomplished by the server key function.

The client key function then concatenates the partial sequences thus arranged, and outputs the client key $K_i$. For example, when i=1, the client key function outputs the client key $K_1$ indicated by Equation (9) below. In FIG. 8, (e) indicates a client key $K_1$ output when n=3, i=1.

$$K_1 = K^{\{1\}} \| K^{\{1,2\}}, K^{\{1,3\}} \| \ldots K^{\{1,2,3\}} \| \ldots K^{\{1,2,\ldots,n\}} \quad (9)$$

As another example, when i=2, the client key function outputs the client key $K_2$ indicated by Equation (10) below. In FIG. 8, (f) indicates the client key $K_2$ output when n=3, i=2.

$$K_2 = K^{\{2\}} \| K^{\{1,2\}} \| K^{\{2,3\}} \| \ldots K^{\{1,2,3\}} \| \ldots K^{\{1,2,\ldots,n\}} \quad (10)$$

As still another example, when i=n, the client key function outputs a client key $K_n$ as indicated by Equation (11) below. In FIG. 8, (g) indicates a client key $K_3$ output when n=3, i=3.

$$K_n = K^{\{n\}} \| K^{\{1,n\}} \| K^{\{2,n\}} \| \ldots K^{\{1,2,n\}} \| \ldots K^{\{1,2,\ldots,n\}} \quad (11)$$

The partial sequences may be arranged in any predetermined way.

In the client key $K_i$ thus generated, a partial sequence mapped to a set D of two or more indices (elements) has a correlation with the other client keys $K_j$. In this manner, the generating device 20 according to the first embodiment can keep the total bit length of the n client keys $K_i$ shorter than the bit length $l_S$ of the server key $K_S$ by using such a client key function as a client key rule.

Figure 9:
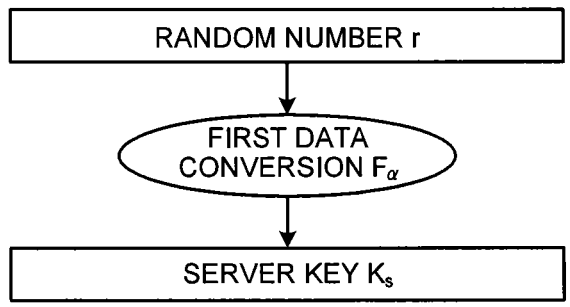
FIG. 9 is a schematic diagram illustrating details of a variation of the server key function.

FIG. 9 is a schematic diagram illustrating details of a variation of the server key function. The server key function may be a function that generates a server key $K_S$ by performing a data conversion (first data conversion $F_\alpha$) to the random number r, without limitation to the function whose details are explained with reference to FIG. 7.

As an example, the first data conversion $F_\alpha$ may be a function outputting the random number r as they are as the server key $K_S$, as indicated by Equation (21) below.

$$K_s = r \quad (21)$$

As another example, the first data conversion $F_\alpha$ may output a sequence resulting from converting the random number r with a function $F_1$, as indicated by Equation (22) below. As an example, $F_1$ is a one-to-one function, a pseudo-random function, or a hash function. $F_1$ outputs $l_S$ bits ($l_r \geq l_S$) for an input of $l_r$ bits.

$$K_s = F_1(r) \quad (22)$$

As still another example, the first data conversion $F_\alpha$ may output a result of an EXCLUSIVE-OR performed on the random number r and a sequence resulted from converting the random number r with a function $F_2$, as indicated by Equation (23) below. As an example, $F_2$ is a one-to-one function, a pseudo-random function, a hash function, or a constant function. $F_2$ outputs $l_S$ bits for an input of $l_S$ bits.

$$K_s = r \oplus F_2(r) \quad (23)$$

As another example, the first data conversion $F_\alpha$ may output a result of an EXCLUSIVE-OR performed on a sequence resulting from converting the random number r with a function $F_1$ and a sequence resulting from converting the random number r with a function $F_3$, as indicated by Equation (24) below. As an example, $F_3$ is a one-to-one function, a pseudo-random function, a hash function, or a constant function. $F_3$ outputs $l_S$ bits ($l_r \geq l_S$) for an input of $l_r$ bits.

$$K_s = F_1(r) \oplus F_3(r) \quad (24)$$

Figure 10:
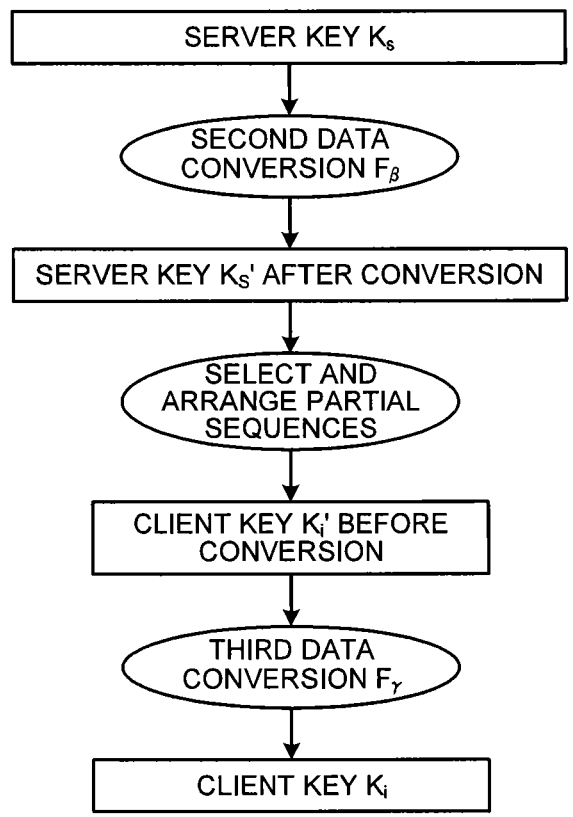
FIG. 10 is a schematic diagram illustrating details of a variation of the client key function.

FIG. 10 is a schematic diagram illustrating details of a variation of the client key function. The client key function may also be a function that applies a data conversion (second data conversion $F_\beta$) to the sequence of the server key $K_S$, and generates a plurality of client keys $K_i$ from the sequence of a server key $K_S'$ resulted from the conversion, without limitation to the function whose details are explained with reference to FIG. 8.

For example, the second data conversion $F_\beta$ may be a function that outputs the server key $K_S$ applied with the conversion as it is, as the server key $K_S'$, as indicated by Equation (31) below.

$$K_s'=K_s \quad (31)$$

As another example, the second data conversion $F_R$ may also output a sequence resulting from converting the server key $K_S$ with a function $F_4$, as the server key $K_S'$ after conversion, as indicated by Equation (32) below. As an example, $F_4$ is a one-to-one function, a pseudo-random function, or a hash function. $F_4$ outputs $l_S$ bits for an input of $l_S$ bits.

$$K_s'=F_4(K_s) \quad (32)$$

As another example, the second data conversion $F_\beta$ may also output a result of an EXCLUSIVE-OR performed on the server key $K_S$ and a sequence resulting from converting the server key $K_S$ with a function $F_5$, as the server key $K_S'$ after conversion, as indicated by Equation (33) below. As an example, $F_5$ is a one-to-one function, a pseudo-random function, a hash function, or a constant function. $F_5$ outputs $l_S$ bits for an input of $l_S$ bits.

$$K_s'=K_s \oplus F_5(K_s) \quad (33)$$

As another example, the second data conversion $F_\beta$ may also output a result of an EXCLUSIVE-OR performed on a sequence resulting from converting the server key $K_S$ with a function $F_4$ and another sequence resulting from converting the server key $K_S$ with a function $F_5$, as the server key $K_S'$ after conversion, as indicated by Equation (34) below.

$$K_s'=F_4(K_s)F_5(K_s) \quad (34)$$

The client key function may also be a function that generates a client key $K_i$ by applying a data conversion (third data conversion $F_\gamma$ to a sequence acquired by arranging the partial sequences $K^D$ selected from the sequence of the server key $K_S'$ after conversion into a row (client key $K_i'$ before conversion), without limitation to the function whose details are explained with reference to FIG. 8.

As an example, the third data conversion $F_\gamma$ may be a function that outputs the client key $K_i'$ before conversion as it is, as the client key $K_i$, as indicated by Equation (41) below.

$$K_i=K_i' \quad (41)$$

As another example, the third data conversion $F_\gamma$ may output a sequence resulting from converting the client key $K_i'$ before conversion with a function $F_6$, as the client key $K_i$, as indicated by Equation (42) below. As an example, $F_6$ is a one-to-one function, a pseudo-random function, or a hash function. $F_6$ outputs $l_i$ bits for an input of $l_i$ bits.

$$K_i=F_6(K_i') \quad (42)$$

$F_6$ may also consider $K_i'$ as a row vector, and multiply an invertible matrix R to $K_i'$ from the right, as indicated by Equation (43) below. For example, $F_6$ performs the calculation considering one bit of $K_i'$ as an element of a vector and an invertible matrix $l_i \times l_i$ as R. As another example, a number represented by a plurality of bits in $K_i'$ may be considered as an element of a vector. R may be handled as public information. By multiplying the invertible matrix R to the client key $K_i'$ before conversion, the positions of bits in a common partial sequence can be changed among the client keys $K_i$ including a common partial sequence. In this manner, even when an attacker acquires the client key $K_i$, it is impossible for the attacker to guess the position of the bits included in the common partial sequence in the bit sequence of a client key $K_j$ sharing the common partial sequence with the client key $K_i$.

$$F_6(K_i')=K_i' \times R \quad (43)$$

As another example, the third data conversion $F_\gamma$ may output a result of an EXCLUSIVE-OR performed on the client key $K_i'$ before conversion and a sequence resulting from converting the client key $K_i'$ before conversion with a function $F_7$, as the client key $K_i$, as indicated by Equation (44) below. As an example, $F_7$ is a one-to-one function, a pseudo-random function, a hash function, or a constant function. $F_7$ outputs $l_i$ bits for an input of $l_i$ bits.

$$K_i=K_i' \oplus F_7(K_i') \quad (44)$$

As another example, the third data conversion $F_\gamma$ may also output a result of an EXCLUSIVE-OR performed on a sequence resulting from converting the client key $K_i'$ before conversion with the function $F_6$ and a sequence resulting from converting the client key $K_i'$ before conversion with the function $F_7$, as the client key $K_i$, as indicated by Equation (45) below.

$$K_i=F_6(K_i') \oplus F_7(K_i') \quad (45)$$

As another example, the third data conversion $F_\gamma$ may also output a sequence resulting from converting the client key $K_i'$ before conversion and the set D with a function $F_8$, as the client key $K_i$, as indicated by Equation (46) below. $F_8$ deletes a partial sequence $K^D$ corresponding to the set D from $K_i'$.

$$K_i=F_8(K_i',D) \quad (46)$$

As another example, the third data conversion $F_\gamma$ may also output a plurality of sequences resulting from converting the client key $K_i'$ before conversion with a function $F_9$, as a plurality of client keys $K_i$, $K_j$, as indicated by Equation (47) below. $K_j$ represents a client key that is different from $K_i$. As an example, $F_9$ is a one-to-one function, a pseudo-random function, or a hash function.

$$k_i \| k_j = F_9(K_i',K_j') \quad (47)$$

$F_9$ may also consider a plurality of client keys $K_i'$ as one row vector, and multiply an invertible matrix R to the client keys $K_i'$ from the right, as indicated by Equation (48) below. Equations (47) and (48) represents an example in which there are two client keys $K_i'$ before conversion, but there may be three or more client keys $K_i'$ before conversion.

$$F_9(K_i',K_j')=[K_i',K_j'] \times R \quad (48)$$

Second Embodiment

Figure 11:
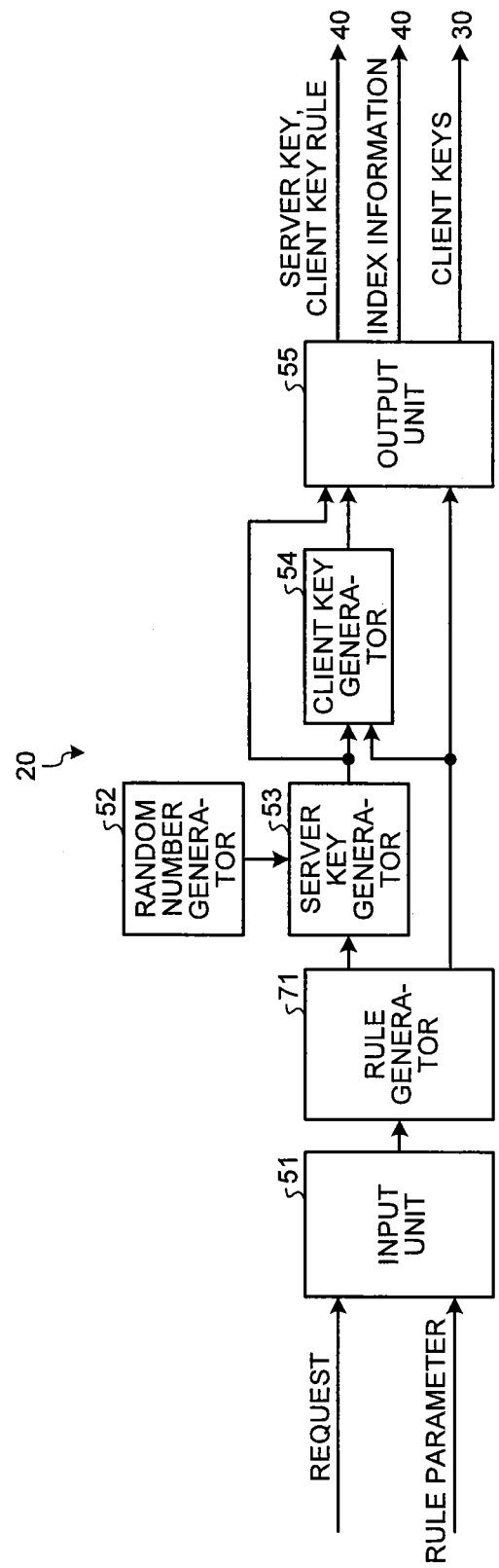
FIG. 11 is a schematic diagram of the configuration of a generating device according to the second embodiment.

FIG. 11 is a schematic diagram of the configuration of the generating device 20 according to a second embodiment. The encryption system 10 according to the second embodiment has approximately the same function and configuration as the encryption system 10 according to the first embodiment. Therefore, in the description of the encryption system 10 according to the second embodiment, units having approximately the same function and configuration as those according to the first embodiment are assigned with the same reference numerals, and explanations thereof except for the differences are omitted hereunder.

The generating device 20 according to the second embodiment includes the input unit 51, a rule generator 71, the random number generator 52, the server key generator 53, the client key generator 54, and the output unit 55.

The input unit 51 according to the second embodiment receives inputs of a key generation request and a rule parameter entered by a user. The rule parameter is a value for designating bit lengths of a plurality of partial sequences to be used in generating a server key $K_S$ and client keys $K_i$. The input unit 51 passes the rule parameter thus entered to the rule generator 71.

The rule generator 71 generate a server key rule and a client key rule both of which use a plurality of partial sequences having the bit lengths thus designated, based on the rule parameter. In this example, the rule generator 71 generates a server key function and a client key function based on the rule parameter.

The rule generator 71 passes the server key rule thus generated (in this example, the server key function) to the server key generator 53. The rule generator 71 also passes the client key rule thus generated (in this example, client key function) to the client key generator 54 and to the output unit 55.

Figure 12:
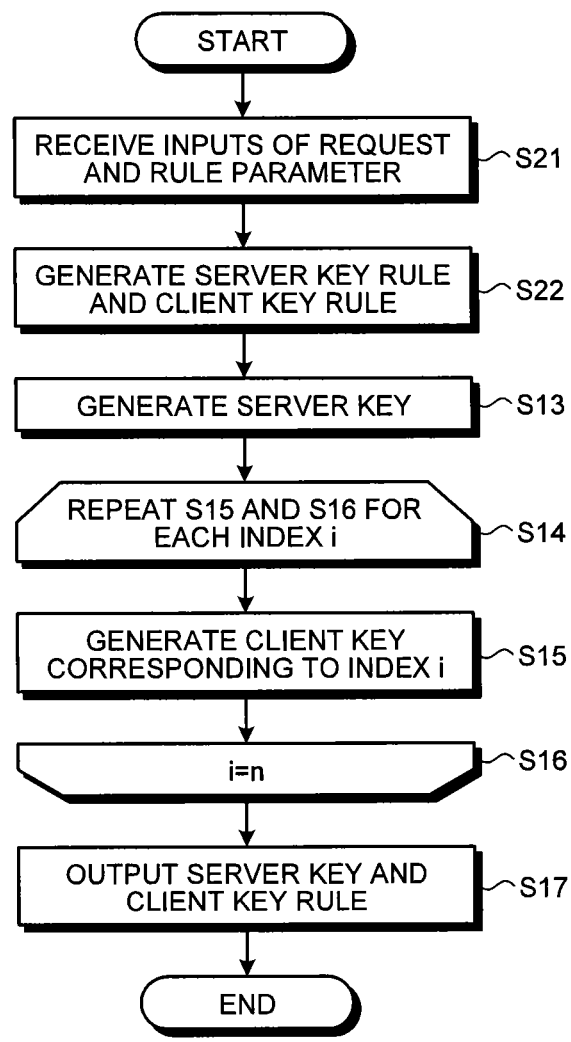
FIG. 12 is a flowchart of a process performed by the generating device according to the second embodiment.

FIG. 12 is a flowchart of a process performed by the generating device 20 according to the second embodiment. To begin with, at Step S21, the input unit 51 in the generating device 20 according to the second embodiment receives inputs of a key generation request and a rule parameter entered by a user.

At Step S22, the rule generator 71 in the generating device 20 according to the second embodiment generates a server key rule and a client key rule both of which use a plurality of partial sequences having a bit length designated via the rule parameter. When used is the variation of the server key function according to the first embodiment, the rule generator 71 generates a server key rule and a client key rule that uses a plurality of partial sequences having a bit length designated by the rule parameter. Subsequently, at Steps S13 to S17, the generating device 20 according to the second embodiment performs the same process as that according to the first embodiment illustrated in FIG. 6.

Figure 13:
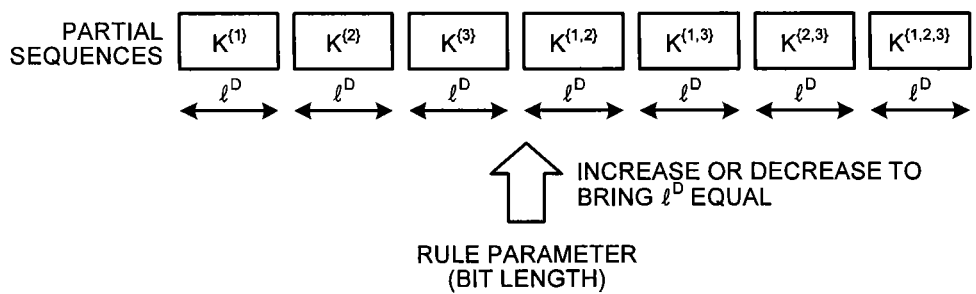
FIG. 13 is a schematic diagram of a first example in which the generating device according to the second embodiment increases or decreases the bit length of partial sequences based on a rule parameter.

FIG. 13 is a schematic diagram of a first example in which the generating device 20 according to the second embodiment increases or decreases the bit lengths of the partial sequences based on the rule parameter. As an example, the input unit 51 in the generating device 20 receives a rule parameter for making the bit lengths $1^D$ of all of the partial sequences equal. The rule generator 71 in the generating device 20 then generates a server key function and a client key function making the bit lengths of all of the partial sequences equal. In this manner, the generating device 20 can make the bit lengths of a plurality of client keys $K_i$ equal, and adjust the client keys $K_i$ to a bit length appropriate for the environment or the like.

Figure 14:
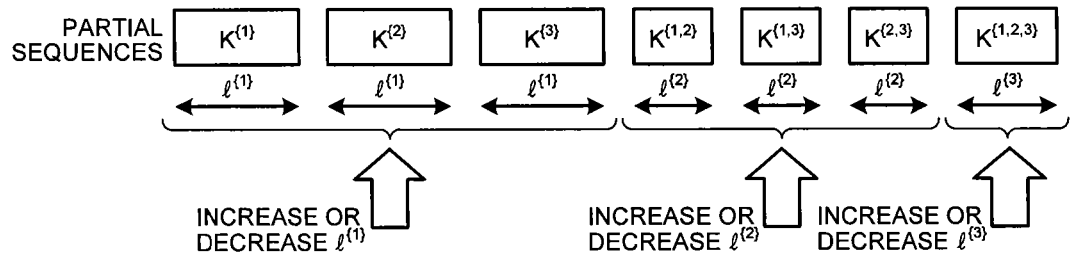
FIG. 14 is a schematic diagram of a second example in which the generating device according to the second embodiment increases or decreases the bit length of partial sequences based on a rule parameter.

FIG. 14 is a schematic diagram of a second example in which the generating device 20 according to the second embodiment increases or decreases the bit lengths of the partial sequences based on the rule parameter. As an example, the input unit 51 in the generating device 20 receives a rule parameter making the bit lengths of the partial sequences equal in units of those mapped to sets D having the same number of indices. The rule generator 71 in the generating device 20 then generates a server key function and a client key function making the bit lengths of the partial sequences equal, in units of those mapped to sets D having the same number of indices.

The lengths of the partial sequences mapped to a set D of d indices is represented as $1^{\{d\}}$. In other words, $1^{\{1\}}$ represents the bit lengths of the partial sequences mapped to a set D of one index. $1^{\{2\}}$ represents the bit lengths of the partial sequences mapped to a set D of two indices. $1^{\{n\}}$ represents the bit lengths of the n partial sequences mapped to a set D of n indices i.

A partial sequence mapped to a set D of one index (e.g., D={1}, {2}, ..., {n}) has a correlation with only one client key $K_i$, that is, does not have a correlation with a plurality of client keys $K_i$. Therefore, by generating a server key function and a client key function that increase the bit lengths $1^{\{1\}}$ of the partial sequences mapped to a set D of one index, the generating device 20 can improve the security level.

A partial sequence mapped to a set D of two or more indices (e.g., D={1, 2}, {1, 3}, ..., {1, 2, 3, ..., n}) has a correlation with a plurality of client keys $K_i$. Therefore, by generating a server key function and a client key function that increase the bit lengths of the partial sequences mapped to a set D of two or more indices (e.g., $1^{\{2\}}, 1^{\{3\}}, \ldots, 1^{\{n\}}$), the generating device 20 can further reduce the bit length of the server key $K_S$.

In particular, a partial sequence mapped to a set D of a larger number of indices has a correlation with a larger number of client keys $K_i$. Therefore, by generating a server key function and a client key function that further increase the bit length of partial sequences mapped to a set of larger numbers of indices, the generating device 20 can efficiently reduce the bit length of the server key $K_S$.

Because the generating device 20 according to the second embodiment allows a user to set the rule parameter, the security level of the client keys $K_i$ and the length of the server key $K_S$ can be adjusted based on the environment in which the ciphertexts are used, for example.

Furthermore, by making the bit lengths of the partial sequences mapped to sets D having the same number of indices equal, the generating device 20 can make the bit lengths of a plurality of client keys $K_i$ equal. In this manner, the generating device 20 can achieve a symmetric relation between the bit sequences having a correlation to each other, in a plurality of client keys $K_i$. In other words, the generating device 20 can make the amount of correlation between any pairs of the client keys $K_i$ equal.

Third Embodiment

Figure 15:
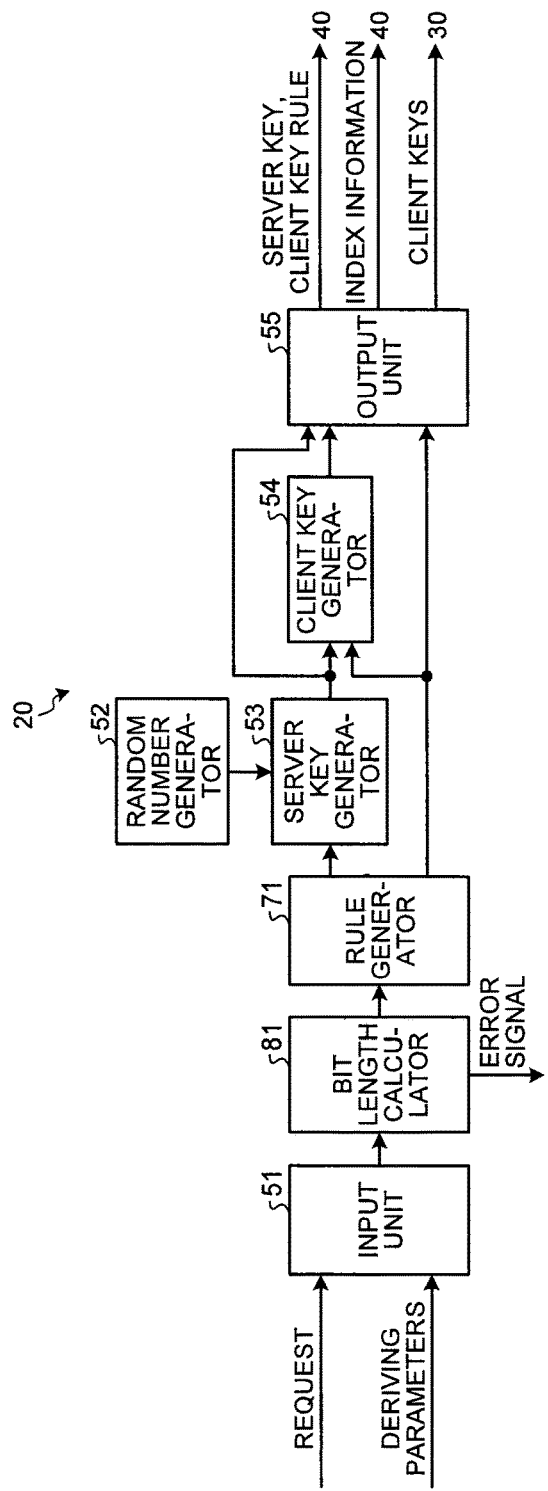
FIG. 15 is a schematic diagram of the configuration of a generating device according to a third embodiment.

FIG. 15 is a schematic diagram of the configuration of the generating device 20 according to the third embodiment. The encryption system 10 according to the third embodiment has approximately the same function and configuration as the encryption system 10 according to the second embodiment. Therefore, in the description of the encryption system 10 according to the third embodiment, units having approximately the same function and configuration with those according to the second embodiment are assigned with the same reference numerals, and explanations thereof except for the differences are omitted hereunder.

To begin with, preconditions applied to the encryption system 10 according to the third embodiment will be explained. As a first precondition, it is assumed that the number of the client keys $K_i$, the number of plaintexts M, and the number of ciphertexts C are all n. As a second precondition, it is assumed herein that the bit length of the plaintext M and the bit length of the client key $K_i$ are the same.

As a third precondition, it is assumed herein that the bit lengths of the partial sequences mapped to the sets D having the same number of indices are the same. The bit lengths of the partial sequences are represented in the same manner as in FIG. 14, and the length of the partial sequences mapped to a set D of d indices is represented as $1^{\{d\}}$. Based on the third precondition, the bit lengths of a plurality of client keys $K_i$ become the same. Also based on the third precondition, a relation between correlating bit sequences in a plurality of client keys $K_i$ becomes symmetric.

Assumptions about an attacker against the encryption system 10 according to the third embodiment will now be explained. As a first assumption, the attacker tries to acquire t plaintexts (where t is an integer equal to or more than one and equal to or less than n) as a target of an attack. As a second assumption, when the number of target plaintexts is t (t is an integer equal to or more than one and equal to or less than n), the maximum number of client keys $K_i$ acquired by the attacker is n-t.

Based on the preconditions and the assumptions described above, a third embodiment will now be explained. The generating device 20 according to the third embodiment includes the input unit 51, a bit length calculator 81, the rule generator 71, the random number generator 52, the server key generator 53, the client key generator 54, and the output unit 55.

The input unit 51 according to the third embodiment receives inputs of a key generation request and n deriving parameters entered by a user. The input unit 51 passes the n deriving parameters thus entered to the bit length calculator 81.

The n deriving parameters indicate the security of one plaintext in each of the cases in which the attacker comes to know n ciphertexts and y client keys $K_i$ (when y takes each of the integers equal to or more than zero and equal to or less than n−1). The security is a value specified by a user. The user can set a value equal to or more than zero and equal to or less than one to each of the n deriving parameters. A larger value (that is, a value nearer one) represents a higher security.

The deriving parameters are represented as $a_{1,y}$. y represents the number of client keys $K_i$ the attacker comes to know. In other words, the input unit 51 receives inputs of $a_{1,0}, a_{1,1}, \ldots, a_{1,n-1}$.

The bit length calculator 81 calculates each bit length of a plurality of partial sequences $(1^{\{2\}}, 1^{\{3\}}, \ldots 1^{\{n\}})$ satisfying the conditions of the n deriving parameters and making the bit length of the server key $K_S$ shortest. The bit length calculator 81 passes the bit length of each of the partial sequences to the rule generator 71.

When the bit length calculator 81 cannot generate client keys $K_i$ that satisfy the deriving parameters specified by a user, the bit length calculator 81 outputs the bit lengths of one or more partial sequences as negative values. When a negative bit length is calculated, the bit length calculator 81 outputs an error signal without passing the bit length to the rule generator 71.

Figure 16:
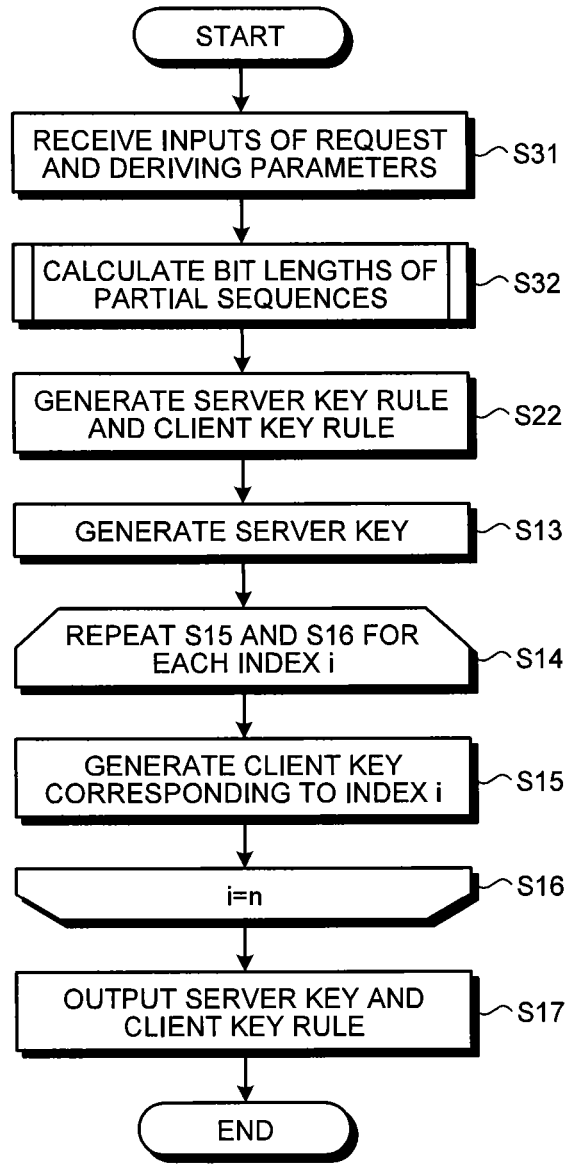
FIG. 16 is a flowchart of a process performed by the generating device according to the third embodiment.

FIG. 16 is a flowchart of a process performed by the generating device 20 according to the third embodiment. To begin with, at Step S31, the input unit 51 in the generating device 20 receives inputs of a key generation request and the n deriving parameters entered by a user.

At Step S32, the bit length calculator 81 in the generating device 20 calculates the bit lengths of a plurality of partial sequences based on the deriving parameters. At Steps S22 to S17, the generating device 20 performs the same process as that according to the second embodiment illustrated in FIG. 12.

Figure 17:
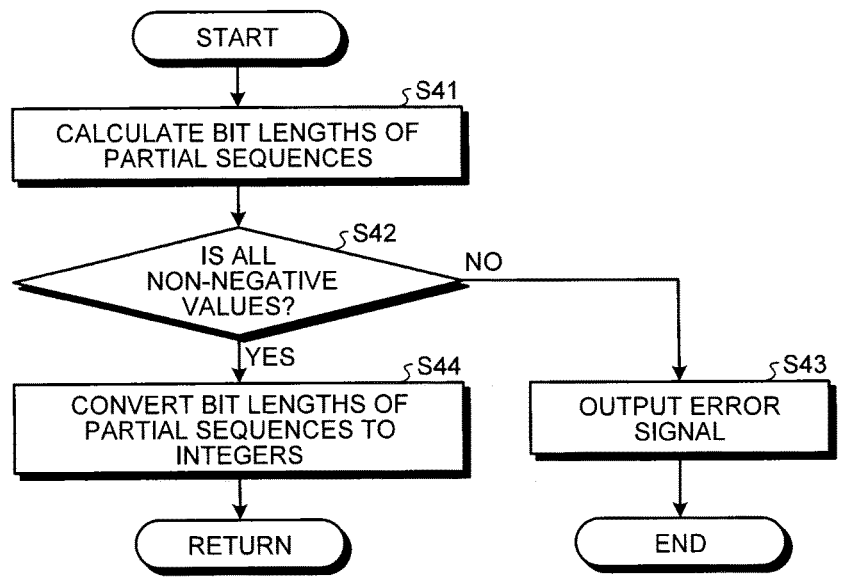
FIG. 17 is a flowchart of a process of calculating bit lengths of partial sequences at Step S32.

FIG. 17 is a flowchart of the process calculating the bit lengths of the partial sequences at Step S32. At Step S32, the bit length calculator 81 performs the process at Steps S41 to S44 to be described below.

At Step S41, the bit length calculator 81 calculates each of the bit lengths of the partial sequences $(1^{\{2\}}, 1^{\{3\}}, \ldots 1^{\{n\}})$ by performing the operation of Equation (51) below to the n deriving parameters $(a_{1,0}, a_{1,1}, \ldots, a_{1,n-1})$ $$\begin{bmatrix} i(1) \\ i(2) \\ \vdots \\ i(n) \end{bmatrix} = q \begin{bmatrix} a_{10} \\ a_{11} \\ \vdots \\ a_{1n} \end{bmatrix} \backslash P \tag{51}$$

In Equation (51), q is a non-negative real number that can be handled by a computer, and can be specified by a user. The symbol "\" represents a left matrix division operation. P is an n×n matrix. P is a matrix in which the elements of the Pascal's triangle are arranged from the first column toward the first row in the n-th row.

Specifically, the elements $p_{n,1}$ in the first column in the n-th row, the element $p_{n,j}$ in the j-th column of the n-th row, and the element $p_{i,j}$ in j-th column in the i-th row in the matrix P are as expressed by Equation (52) below.

$$P_{n,1}=1, P_{n,j}=0(j>1), P_{i,j}=P_{i+1,j-1}+P_{i+1,j}(i<n,j>1) \tag{52}$$

For example, when n=4, the matrix P is as expressed by Equation (53) below.

$$P = \begin{bmatrix} 1 & 3 & 3 & 1 \\ 1 & 2 & 1 & 0 \\ 1 & 1 & 0 & 0 \\ 1 & 0 & 0 & 0 \end{bmatrix} \tag{53}$$

As another example, when n=7, the matrix P is as expressed by Equation (54) below.

$$P = \begin{bmatrix} 1 & 6 & 15 & 20 & 15 & 6 & 1 \\ 1 & 2 & 10 & 10 & 5 & 1 & 0 \\ 1 & 4 & 6 & 4 & 1 & 0 & 0 \\ 1 & 3 & 3 & 1 & 0 & 0 & 0 \\ 1 & 2 & 1 & 0 & 0 & 0 & 0 \\ 1 & 1 & 0 & 0 & 0 & 0 & 0 \\ 1 & 0 & 0 & 0 & 0 & 0 & 0 \end{bmatrix} \tag{54}$$

At Step S42, the bit length calculator 81 then determines if the bit lengths $(1^{\{2\}}, 1^{\{3\}}, \ldots 1^{\{n\}})$ of the partial sequences thus calculated are non-negative values. If any of the bit lengths is a negative value (No at Step S43), because the bit length calculator 81 cannot generate a client key $K_i$ satisfying the specified deriving parameters at Step S43, the bit length calculator 81 outputs an error signal, and ends the process.

If all of the bit lengths are non-negative values (Yes at Step S43), at Step S44, the bit length calculator 81 converts each of the bit lengths of the partial sequences thus calculated $(1^{\{2\}}, 1^{\{3\}}, \ldots 1^{\{n\}})$ to an integer. As an example, the bit length calculator 81 rounds down, rounds up, or rounds off the fractional part.

Once the process at Step S44 is completed, the bit length calculator 81 moves the process to Step S22 in FIG. 16.

An example of the bit lengths of the partial sequences calculated when n=4 will now be explained. For example, it is assumed herein that $[a_{1,0}, a_{1,1}, a_{1,2}, a_{1,3}]^T = [1\ 0.75\ 0.5\ 0.25]^T$ is entered as the deriving parameters, and that q=100.

The T appended as a superscript to the matrix means that the matrix is a transposed matrix. In this case, the bit length calculator 81 outputs $[1^{(1)}\ 1^{(2)}\ 1^{(3)}\ 1^{(4)}]^T=[25\ 25\ 0\ 0]^T$.

As another example, when $[a_{1,0}\ a_{1,1}\ a_{1,2}\ a_{1,3}]^T=[1\ 0.50\ 0.25\ 0.125]^T$ is entered as the deriving parameters and q=40, the bit length calculator 81 outputs $[1^{(1)}\ 1^{(2)}\ 1^{(3)}\ 1^{(4)}]^T=[5\ 5\ 5\ 5]^T$.

As described above, the generating device 20 according to the third embodiment can generate client keys $K_i$ having the security specified by the deriving parameters that are entered by a user. Furthermore, the generating device 20 according to the third embodiment can output an error signal when the generating device 20 is incapable of generating client keys $K_i$ satisfying the security specified by the deriving parameters that are entered by a user.

The security and optimal bit lengths of the partial sequences will now be explained further.

The security of x plaintexts (where x is an integer equal to or more than one and equal to or less than n) when an attacker comes to know n ciphertexts and y client keys $K_i$ is represented as $a_{x,y}$. In this case, $a_{x,y}$ is defined as a ratio of the entropy of the x plaintexts in a case in which the attacker comes to know all of the ciphertexts and y client keys $K_i$ with respect to the entropy of the x plaintexts, as expressed by Equation (55) below.

$$a_{x,y} = \text{(Entropy of } i \text{ plaintexts when an attacker comes know all ciphertexts and } y \text{ keys)/(Entropy of } x \text{ plaintexts)} \quad (55)$$

For example, the security $a_{x,y}$ for a case in which the number of the client keys $K_i$ is four (n=4) is as illustrated in FIG. 18. $K_i$ in FIG. 18 represents random variables for the client keys. $M_i$ represents random variables for the plaintext. C represents random variables ($C=C_1 C_2 \ldots C_n$) for the entire ciphertexts. $H(M_i)$ represents the entropy of $M_i$. $H(M_i|CK_i)$ represents the entropy of the plaintext $M_i$ when the attacker comes to know all of the ciphertexts and the client keys $K_i$.

The client keys $K_i$ are configured in such a manner that the correlated bit sequences among the client keys $K_i$ have a symmetric relation. Therefore, the security $a_{x,y}$ illustrated in FIG. 18 remains the same even if the subscript for the plaintext or for the client key is changed, as indicated by Equation (56) below.

$$a_{1,1} = \frac{H(M_2 | CK_1)}{H(M_2)} \quad (56)$$
$$= \frac{H(M_3 | CK_4)}{H(M_3)}$$
$$= \ldots$$
$$= \frac{H(M_\alpha | CK_\beta)}{H(M_\alpha)}$$

When the number of the client keys $K_i$ is n, there are $\{n(n+1)/2\}$ possible patterns for the security $a_{x,y}$. From the security $a_{1,y}$, for a case in which the number of target plaintexts is one, the security of each one of the other patterns can be derived as indicated by Equation (57) below.

$$a_{x,y} \geq \frac{1}{i} \sum_{m}^{x-1} a_{1,y+m} \quad (57)$$

For example, when the number of the client keys $K_i$ is four (n=4), the security $a_{x,y}$ derived from the security $a_{1,y}$ for a case in which the number of target plaintexts is one is as illustrated in FIG. 19.

When at least the security is satisfied, it is preferable for the server key $K_S$ to be shorter. Therefore, the bit lengths of the optimal partial sequences can be defined as a value that satisfies the security of every one of these patterns and resulting in the shortest server key $K_S$ length.

Therefore, in Equation (51), based on the n deriving parameters $a_{x,y}$, the generating device 20 according to the third embodiment can acquire the security of every one of the other patterns, and calculate the bit lengths of the partial sequences satisfying every security and resulting in the shortest server key $K_S$ length. In the manner described above, the generating device 20 according to the third embodiment can calculate a plurality of client keys $K_i$ satisfying the security requirement of a user, while keeping the bit length of the server key $K_S$ short.

Fourth Embodiment

Figure 20:
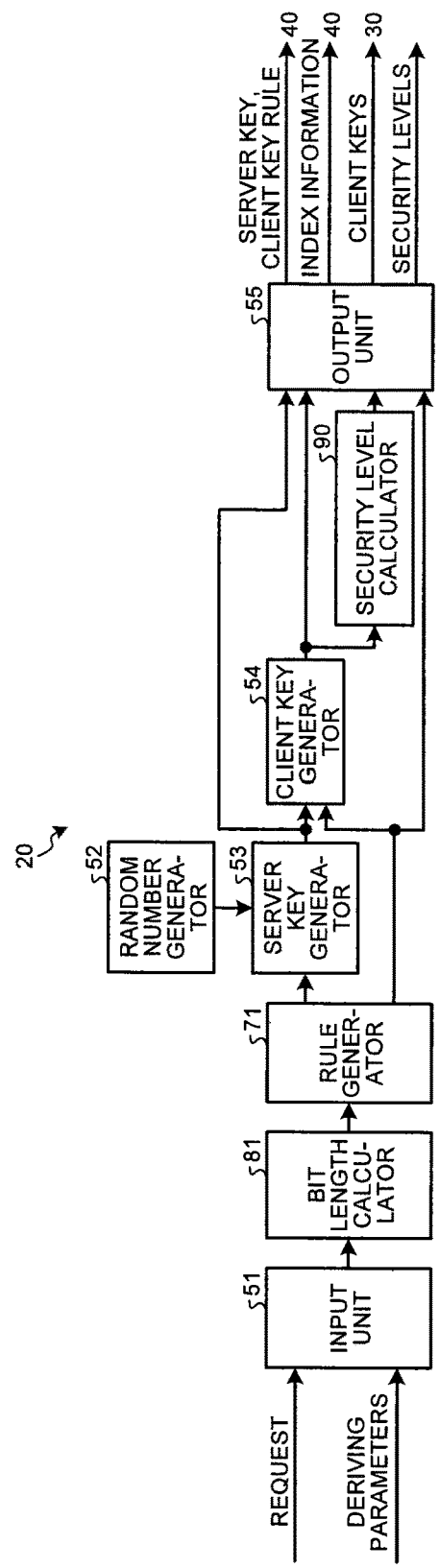
FIG. 20 is a schematic diagram of the configuration of a generating device according to a fourth embodiment.

FIG. 20 is a schematic diagram of the configuration of the generating device 20 according to the fourth embodiment. The encryption system 10 according to the fourth embodiment has approximately the same function and configuration as those of the encryption system 10 according to the third embodiment. Therefore, in the description of the encryption system 10 according to the fourth embodiment, units having approximately the same function and configuration as those according to the third embodiment are assigned with the same reference numerals, and explanations thereof except for the differences are omitted hereunder.

The generating device 20 according to the fourth embodiment further includes a security level calculator 90. The security level calculator 90 outputs a security level corresponding to the number of other client keys $K_i$ having a correlation with a plurality of respective bits included in at least one client key $K_i$. In other words, the security level is a value corresponding to a bit in the client key $K_i$, and represents how the bit has a correlation with other client keys $K_i$.

For example, each bit in a client key $K_i$ is included in some of the partial sequences $K^D$. Therefore, the security level calculator 90 outputs sets D mapped to the partial sequences $K^D$ including such a bit as the security level. In this manner, the security level calculator 90 can cause an apparatus using the client key $K_i$ to detect with which one of the client keys $K_i$ the bit has a correlation, and how many client keys $K_i$ the bit has a correlation with.

The output unit 55 outputs the client key $K_i$ as well as the security level to the client terminal 30. The client terminal 30 receiving the security level and the client key $K_i$ selects some bits to be used in encryption from the entire sequence of the client key $K_i$ based on the security level, and performs the encryption using the bits thus selected.

The client terminal 30 then transmits the ciphertext and the positions of the bits making up a part of the client key $K_i$ used in the encryption to the server 40. In this manner, the encryption system 10 according to the fourth embodiment can perform encryption using more secure bits.

Fifth Embodiment

Figure 21:
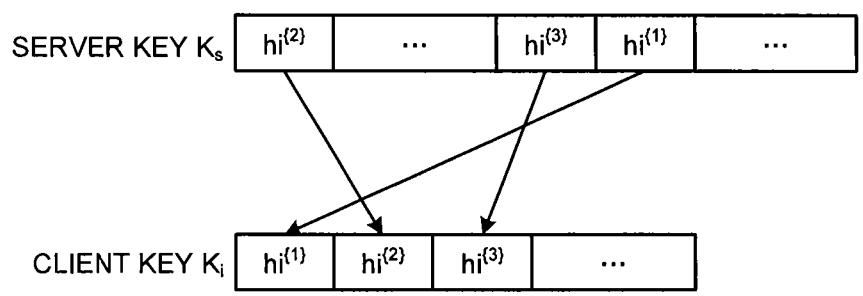
FIG. 21 is a schematic diagram of an example of a server key $K_S$ and a client key $K_i$ generated by a generating device according to a fifth embodiment.

FIG. 21 is a schematic diagram of an example of a server key $K_S$ and a client key $K_i$ generated by the generating device 20 according to the fifth embodiment. The encryption system 10 according to the fifth embodiment has approximately the same function and the configuration as the encryption system 10 according to the first embodiment. Therefore, in the description of the encryption system 10 according to the fifth embodiment, units having approximately the same function and configuration as those according to the first embodiment are assigned with the same reference numerals, and explanations thereof except for the differences are omitted hereunder.

The server key generator 53 in the generating device 20 according to the fifth embodiment generates a server key $K_S$ from the random number r using the first data conversion $F_\alpha$ illustrated in FIG. 9. The client key generator 54 in the generating device 20 according to the fifth embodiment then generates client keys $K_i$ by executing a client key function which will be explained below.

The client key function calculates a hash value H(i) by assigning an index i to a hash function. The client key function then generates partial hash sequences $h_i^{(1)}$, $h_i^{(2)}$, $h_i^{(3)}$, . . . by dividing the hash value H(i) in units of a predetermined number of bits, as indicated by Equation (61) below.

$$H(i)=h_i^{(1)}\|h_i^{(2)}\|h_i^{(3)}\| \qquad (61)$$

Each of the partial hash sequences $h_i^{(1)}$, $h_i^{(2)}$, $h_i^{(3)}$, . . . indicates a bit position in the server key $K_S$. When the partial hash sequences $h_i^{(1)}$, $h_i^{(2)}$, $h_i^{(3)}$, . . . are redundant, the client key function deletes the redundant portion. For example, when $\{h_i^{(1)}, h_i^{(2)}, h_i^{(3)}, h_i^{(4)}\}=[3, 6, 6, 4]$, the client key function deletes the redundant "6" to achieve $\{3, 6, 4\}$.

The client key function then sets the value at each of the bit positions in the server key $K_S$ indicated by the partial hash sequences to each bit of the client key $K_i$, sequentially from the first bit of the client key, and concatenates these values. By using hash values in the manner described above, the generating device 20 according to the fifth embodiment can use a smaller number of steps for generating a client key $K_i$. A hash function is used in the example, but a pseudo-random function using the index i as a seed, or the like may also be used, without limitation to a hash function.

In the first to the fifth embodiments, a server key $K_S$, a client key and a partial sequence $K^D$ are explained to be bit sequences having bit lengths of $1_S$, $1_i$, and $1^D$, respectively. Alternatively, each of the server key $K_S$, the client key $K_i$, and the partial sequence $K^D$ may also be elements of a set of integers from zero to n−1, i.e., elements of Z/nZ=$\{0, 1, \ldots, n-1\}$, or elements of an extension field of Z/pZ, where p is a prime number. In these cases, operations defined on a corresponding ring or field are used for the operations explained in the first to the fifth embodiments.

In the first to the fifth embodiments, the server 40 may include the generating device 20. In such a configuration, the output unit 55 in the generating device 20 passes the server key $K_S$, the client key rule, and the index information to the server side storage unit 61. When a public client key rule is used, the output unit 55 in the generating device 20 does not need to pass the client key rule to the server side storage unit 61.

In the first to the fifth embodiments, the encryption system 10 may include a key distributing unit. In such a configuration, the output unit 55 in the generating device 20 transmits the server key $K_S$, the client key rule, the index information, and the client keys $K_i$ to the key distributing unit. The key distributing unit then transmits the server key $K_S$, the client key rule, and the index information to the server 40, and transmits the client keys $K_i$ to the respective client terminal 30. When a public client key rule is used, the output unit 55 in the generating device 20 does not need to pass the client key rule to the key distributing unit, and the key distributing unit does not need to pass the client key rule to the server 40.

Figure 22:
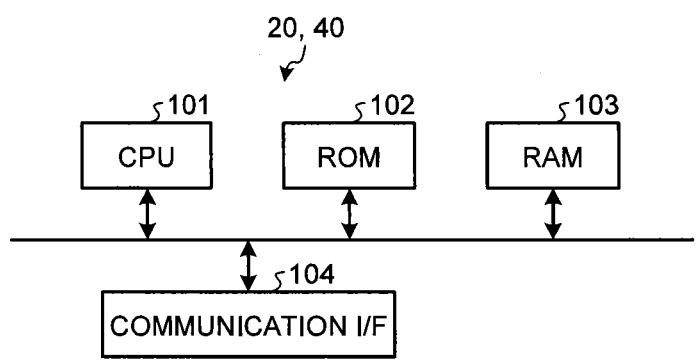
FIG. 22 is a schematic diagram of an example of a hardware configuration of the generating device and the server according to the first to the fifth embodiment.

FIG. 22 is a schematic diagram of an example of a hardware configuration of the generating device 20 and the server 40 according to the first to the fifth embodiment. Each of the generating device 20 and the server 40 according to the first to the fifth embodiment includes a controller such as a central processing unit (CPU) 101, memories such as a read-only memory (ROM) 102 and a random access memory (RAM) 103, a communication interface (I/F) 104 for connecting to a network and establishing communications, and a bus for connecting each of these units.

A computer program executed by the generating device 20 or the server 40 according to the embodiments is provided in a manner incorporated in the ROM 102 or the like in advance.

The computer program executed by the generating device 20 or the server 40 according to the embodiments may be configured to be provided as a computer program product by recording the computer program in a computer-readable storage medium, such as a compact disk read-only memory (CD-ROM), a flexible disk (FD), a compact disk recordable (CD-R), or a digital versatile disk (DVD), as a file in an installable or executable format.

Furthermore, the computer program executed by the generating device 20 or the server 40 according to the embodiments may be configured to be stored in a computer connected to a network such as the Internet and to be provided by allowing the computer program to be downloaded over the network. Furthermore, the computer program executed by the generating device 20 and the server 40 according to the embodiments may be configured to be provided or distributed over a network such as the Internet.

The computer program executed by the generating device 20 according to the embodiment can cause a computer to function as each of the units included in the generating device 20 (the input unit 51, the random number generator 52, the server key generator 53, the client key generator 54, the output unit 55, the rule generator 71, the bit length calculator 81, and the security level calculator 90). The whole or a part of the input unit 51, the random number generator 52, the server key generator 53, the client key generator 54, the output unit 55, the rule generator 71, the bit length calculator 81, and the security level calculator 90 may be implemented with hardware. Furthermore, the computer program executed by the server 40 according to the embodiments can cause a computer to function as each of the units included in the server 40 (the server side client key generator 63, the server side decrypter 64, and the server side encrypter 65). The whole or a part of the server side client key generator 63, the server side decrypter 64, and the server side encrypter 65 may be implemented with hardware. Such a computer can cause the CPU 101 to read the computer program from a computer-readable storage medium onto the main memory and to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A generating device comprising:
a processor that operates as:
a partial sequence generator that generates partial sequences from one or more random numbers;
a first key generator that generates a first key according to a first key rule in which the first key is generated by arranging a plurality of the partial sequences, the first key being a bit sequence;
a second key generator that generates a plurality of second keys according to a second key rule in which the second keys are generated by selecting and arranging one or more of the partial sequences from the sequence of the first key, the second keys being bit sequences partly correlated to one another, wherein one of the second keys is used for encrypting a first plaintext to generate a first ciphertext and another of the second keys is used for encrypting a second plaintext to generate a second ciphertext; and
an output unit that outputs the first key and at least one of the second keys.

2. The device according to claim 1, wherein
the first key generator generates the first key according to the first key rule, the first key rule being secret information,
the second key generator generates the second keys according to the second key rule, the second key rule being secret information, and
the output unit outputs the second key rule together with the first key.

3. The device according to claim 1, wherein
the first key generator generates the first key according to the first key rule that is public information, and
the second key generator generates the second keys according to the second key rule that is public information.

4. The device according to claim 1, wherein
the second key generator generates the second keys according to the second key rule in which the second keys are generated by selecting and arranging two or more of the partial sequences from the sequence of the first key.

5. The device according to claim 4, wherein
the first key generator generates the first key according to the first key rule in which the partial sequences are mapped to a plurality of respective sets each of which has a combination of indices for identifying the respective second keys, and
the second key generator generates the second keys according to the second key rule in which the second keys are generated by selecting two or more of the partial sequences mapped to sets including an input index.

6. The device according to claim 5, wherein the processor further operates as
a rule generator that generates, based on a rule parameter for designating a bit length of the partial sequences, the first key vile and the second key vile using the partial sequences having the bit length thus designated.

7. The device according to claim 6, wherein the rule generator generates the first key rule and the second key rule in which partial sequences mapped to sets each having a same number of indices have a same bit length.

8. The device according to claim 7, wherein
n ciphertexts, where n is an integer equal to or more than two, are generated by encrypting n plaintexts with n second keys, respectively,
the n second keys have a same bit length,
a bit length of each of the plaintexts is equal to a bit length of each of the second keys,
wherein the processor further operates as:
an input unit that receives n deriving parameters entered by a user and representing a security of one plaintext when an attacker comes to know n ciphertexts and y second keys, where y is an integer equal to or more than zero and equal to or less than n−1; and
a bit length calculator that calculates a bit length of each of the partial sequences satisfying a condition of the n deriving parameters.

9. The device according to claim 8, wherein the bit length calculator calculates the bit length of each of the partial sequences satisfying the condition of the n deriving parameters, the partial sequences resulting in a shortest bit length of the first key.

10. The device according to claim 8, wherein the bit length calculator outputs an error signal when a negative bit length is calculated.

11. The device according to claim 4, wherein the second key generator generates the second keys according to the second key rule in which the second keys are generated by data conversion of sequences having been selected from the sequence of the first key and having been arranged.

12. The device according to claim 1, wherein the partial sequence generator generates the partial sequences by data conversion of the random number.

13. The device according to claim 1, wherein the second key generator generates the second keys according to the second key rule in which the second keys are generated based on data obtained by data conversion of the sequence of the first key.

14. The device according to claim 1, wherein the output unit, for each of a plurality of bits included in at least one of the second keys, outputs a security level corresponding to a number of the other second keys correlated to the respective bits.

15. The device according to claim 1, wherein
the first key generator generates the first key according to the first key rule, the first key including the plurality of the partial sequences; and
the second key generator selects, for each of the second keys, two or more of the partial sequences that are part of the plurality of the partial sequences included in the first key and generates the each of the second keys using the selected two or more of the partial sequences according to the second key rule, the each of the second keys being generated using a combination of two or more of the partial sequences, the combination differing for each of the second keys, and at least one of the partial sequences in the two or more of the partial sequences used as a source for generating the each of the second keys being common to at least one of the partial sequences used as a source for generating another of the second keys.

16. The device according to claim 15, wherein
for each of the second keys,
at least one of the partial sequences in the two or more of the partial sequences used as a source for generating the each of the second keys is different from the partial sequences used as a source for generating any other of the second keys.

17. A generating method comprising:

generating, by a processor, partial sequences from one or more random numbers;

generating, by the processor, a first key according to a first key rule in which the first key is generated by arranging a plurality of the partial sequences, the first key being a bit sequence;

generating, by the processor, a plurality of second keys according to a second key rule in which the second keys are generated by selecting and arranging one or more of the partial sequences from the sequence of the first key, the second keys being bit sequences partly correlated to one another, wherein one of the second keys is used for encrypting a first plaintext to generate a first ciphertext and another of the second keys is used for encrypting a second plaintext to generate a second ciphertext; and outputting, by the processor, the first key and at least one of the second keys.

18. A computer program product comprising a non-transitory computer-readable medium containing a program executed by a computer, the program causing the computer to execute:

generating partial sequences from one or more random numbers;

generating a first key according to a first key rule in which the first key is generated by arranging a plurality of the partial sequences, the first key being a bit sequence;

generating a plurality of second keys according to a second key rule in which the second keys are generated by selecting and arranging one or more of the partial sequences from the sequence of the first key, the second keys being bit sequences partly correlated to one another, wherein one of the second keys is used for encrypting a first plaintext to generate a first ciphertext and another of the second keys is used for encrypting a second plaintext to generate a second ciphertext; and outputting the first key and at least one of the second keys.

* * * * *